(12) United States Patent
Venkitachalam

(10) Patent No.: US 11,908,216 B2
(45) Date of Patent: Feb. 20, 2024

(54) MUSICAL NOTATION SYSTEM

(71) Applicant: NKODA LIMITED, London (GB)

(72) Inventor: Sundar Venkitachalam, London (GB)

(73) Assignee: Nkoda Limited, London (GB)

(*) Notice: Subject to any disclaimer, the term of this patent is extended or adjusted under 35 U.S.C. 154(b) by 576 days.

(21) Appl. No.: 17/042,650

(22) PCT Filed: Mar. 26, 2019

(86) PCT No.: PCT/GB2019/050856
§ 371 (c)(1),
(2) Date: Sep. 28, 2020

(87) PCT Pub. No.: WO2019/186138
PCT Pub. Date: Oct. 3, 2019

(65) Prior Publication Data
US 2021/0034854 A1 Feb. 4, 2021

(30) Foreign Application Priority Data
Mar. 28, 2018 (GB) .................. 1805066

(51) Int. Cl.
G06V 30/304 (2022.01)
G06V 30/413 (2022.01)
G06V 30/24 (2022.01)

(52) U.S. Cl.
CPC ......... G06V 30/304 (2022.01); G06V 30/24 (2022.01); G06V 30/413 (2022.01)

(58) Field of Classification Search
CPC .................................. G06V 30/304
See application file for complete search history.

(56) References Cited

U.S. PATENT DOCUMENTS

2012/0250941 A1* 10/2012 Katsuta ............... G06V 30/304
382/103

FOREIGN PATENT DOCUMENTS

JP S6162983 A 3/1986
JP 2008123181 A * 5/2008 ............ G06K 9/346

OTHER PUBLICATIONS

PCT International Search Report and Written Opinion, PCT Application No. PCT/GB2019/050856, dated Aug. 22, 2019, 13 pages.

(Continued)

Primary Examiner — Sean T Motsinger
(74) Attorney, Agent, or Firm — McDonnell Boehnen Hulbert & Berghoff LLP

(57) ABSTRACT

Disclosed herein is a method of identifying a line of a stave or a stem of a note in a digital image of a musical score comprising: converting the digital image into a matrix in which at least one cell of the matrix corresponds to a pixel of the digital image; setting the at least one cell of the matrix to a first value if the corresponding pixel of the digital image has a pixel intensity above a threshold intensity; identifying adjacent cells having the first value as linked cells, the adjacent cells corresponding to pixels being adjacent in one of a horizontal direction or a vertical direction of the digital image; identifying linked cells having a number of cells exceeding a threshold as a chain of cells; grouping adjacent chains of cells into a group of chains; determining a dimension of the group of chains; and comparing the dimension with a dimension threshold; wherein, if the dimension is above the dimension threshold, determining that pixels corresponding to linked cells of the group of chains correspond to a line of a stave if the adjacent cells corresponding to pixels being adjacent in a horizontal direction of the digital image or a stem of a note if the adjacent cells (Continued)

correspond to pixels being adjacent in a vertical direction of the digital image.

13 Claims, 25 Drawing Sheets

(56) References Cited

OTHER PUBLICATIONS

Cardoso, Jaime S., Artur Capela, Ana Rebelo, and Carlos Guedes. "A connected path approach for staff detection on a music score." In 2008 15th IEEE International Conference on Image Processing, pp. 1005-1008. IEEE, 2008.

Tardón, Lorenzo J., Simone Sammartino, Isabel Barbancho, Veronica Gomez, and Antonio Oliver. "Optical music recognition for scores written in white mensural notation." EURASIP Journal on Image and Video Processing 2009 (2009): 1-23.

\* cited by examiner

MUSICAL NOTATION SYSTEM

CROSS-REFERENCE TO RELATED APPLICATIONS

This application is a U.S. National Stage application of International Patent Application PCT/GB2019/050856, filed Mar. 26, 2019, which claims the benefit of priority of United Kingdom Patent Application no. 1805066.6, filed Mar. 28, 2018.

FIELD

The present invention relates to a method for identifying musical notation in a musical score.

BACKGROUND

At present, many musical scores exist in hard copy form or in the form of low quality scanned copies originating from hard copy sources. These sources provide inconsistent quality and are designed for print rather than viewing on electronic platforms. Moreover, they are inconvenient to navigate, annotate and search through.

Optical character recognition is a method of converting images of text into computer encoded text. While the field of optical character recognition of text is well developed, techniques for accurately and efficiently converting sheet music and musical notation into digitised, computer encoded formats are needed.

Identification of musical characters in a musical score is particularly challenging as, unlike with conventional optical character recognition where letters or characters are not superimposed with other letters or characters, in sheet music musical characters are positioned on top of a stave.

SUMMARY

An invention is set out in the claims.

According to a first aspect, there is provided a method of identifying a line of a stave or a stem of a note in a digital image of a musical score comprising: converting the digital image into a matrix in which at least one cell of the matrix corresponds to a pixel of the digital image; setting the at least one cell of the matrix to a first value if the corresponding pixel of the digital image has a pixel intensity above a threshold intensity; identifying adjacent cells having the first value as linked cells, the adjacent cells corresponding to pixels being adjacent in one of a horizontal direction or a vertical direction of the digital image; identifying linked cells having a number of cells exceeding a threshold as a chain of cells; grouping adjacent chains of cells into a group of chains; determining a dimension of the group of chains; and comparing the dimension with a dimension threshold; wherein, if the dimension is above the dimension threshold, determining that pixels corresponding to linked cells of the group of chains correspond to a line of a stave if the adjacent cells corresponding to pixels being adjacent in a horizontal direction of the digital image or a stem of a note if the adjacent cells correspond to pixels being adjacent in a vertical direction of the digital image.

Optionally, the adjacent cells are directly adjacent cells corresponding to pixels being directly adjacent in one of the horizontal direction or the vertical direction.

Optionally, the adjacent chains of cells are directly adjacent chains of cells.

Optionally, the directly adjacent chains of cells are directly adjacent in the other of the horizontal direction or the vertical direction.

The method may further comprise identifying contour cells of the group of chains, wherein the contour cells define a perimeter of pixels of the group of chains.

Optionally, determining a dimension of the group of chains comprises determining a dimension of a bounding box encompassing the group of chains.

According to a second aspect, there is provided a method of identifying a line of a stave in a digital image of a musical score comprising: converting the digital image into a matrix in which at least one cell of the matrix corresponds to a pixel of the digital image; setting at least one cell of the matrix to a first value if the corresponding pixel of the digital image has a pixel intensity above a threshold intensity; and determining that cells with the first value in a row of the matrix correspond to a line of a stave if the total number of cells with the first value in the row is above a threshold value.

Optionally, the digital image is shrunk to create a shrunken digital image before being converted into a matrix, optionally wherein the digital image is shrunk by a factor of at least 2 and preferably at least 4.

The method may further comprise determining the total number of cells with the first value in each of a plurality of rows of the matrix, and determining the largest total number of cells with the first value of each of the plurality of rows, wherein the threshold value is based on the largest total number of cells with the first value, preferably wherein the threshold value is 70% of the largest total number of cells with the first value.

Optionally, the threshold is based on the total number of cells per row, preferably wherein the threshold is 60% of the total number of cells per row.

According to a third aspect, there is provided a method of identifying at least a part of a musical character in a digital image of a musical score comprising: converting the digital image into a matrix in which at least one cell of the matrix corresponds to a pixel of the digital image; setting the at least one cell of the matrix to a first value if the corresponding pixel of the digital image has a pixel intensity above a threshold intensity; identifying cells of the matrix corresponding to line pixels, the line pixels corresponding to a line of a stave and/or a stem of a note in the digital image; identifying a split end of an object in the digital image, wherein the split end comprises cells having the first value and being directly adjacent to those identified as corresponding to line pixels; adding at least one cell having the first value to the split end of the object to create a repaired object, the repaired object comprising the added at least one cell and the object, the at least one cell being directly adjacent to the split end of the object; determining a matching value for the repaired object by comparing a characteristic of the repaired object with a characteristic of a representation of at least part of a musical character; and determining that the repaired object corresponds to the at least part of a musical character if the matching value exceeds a matching threshold.

Optionally, the at least part of a musical character is an entire musical character.

Optionally, the object comprises a group of pixels, the group of pixels all having the first value, wherein each pixel of the group of pixels is directly adjacent to at least one other pixel of the group of pixels.

Optionally, identifying the split end of the object further comprises: determining a dimension of the object; and comparing the dimension with an object threshold dimension wherein, if the dimension is above the object threshold dimension, adding the at least one cell having the first value to the split end of the object.

Optionally, comparing the characteristic of the repaired object with a representation of a musical character comprises: determining a profile of the repaired object; and comparing the profile with the representation of the musical character.

Optionally, the step of identifying cells of the matrix corresponding to line pixels comprises: identifying adjacent cells having the first value as linked cells, the adjacent cells corresponding to pixels being adjacent in one of a horizontal direction or a vertical direction of the digital image; identifying linked cells having a number of cells exceeding a threshold as a chain of cells; grouping adjacent chains of cells into a group of chains; determining a dimension of the group of chains; and comparing the dimension with a dimension threshold; wherein, if the dimension is above the dimension threshold, determining that pixels corresponding to linked cells of the group of chains correspond to a line of a stave if the adjacent cells corresponding to pixels being adjacent in a horizontal direction of the digital image or a stem of a note if the adjacent cells correspond to pixels being adjacent in a vertical direction of the digital image.

Optionally, the step of identifying cells of the matrix corresponding to line pixels comprises: determining that cells with the first value in a row of the matrix correspond to a line of a stave if the total number of cells with the first value in the row is above a threshold value.

According to a fourth aspect, there is provided a method of removing debris from a digital image of a musical score comprising: converting the digital image into a matrix in which at least one cell of the matrix corresponds to a pixel of the digital image; setting the at least one cell of the matrix to a first value if the corresponding pixel of the digital image has a pixel intensity above a threshold intensity; identifying cells of the matrix corresponding to line pixels, the line pixels corresponding to a line of a stave or a stem of a note in the digital image; identifying one or more cells having the first value adjacent to the cells corresponding to line pixels; determining that the one or more cells correspond to debris pixels and setting a value of the cells such that, when the matrix is converted to a digital image, the one or more debris pixels have a colour that is a colour of a background of the digital image.

Optionally, the one or more cells comprises a single cell, the single cell being directly adjacent to cell corresponding to a line pixel, and all other cells directly adjacent to the single cell being cells corresponding to pixels having the colour of the background of the digital image.

Optionally, the one or more cells comprises a group of cells, the group of cells all having the first value, wherein each cell of the group of cells is directly adjacent to at least one other cell of the group of cells.

Optionally, determining that the one or more cells correspond to debris pixels comprises: determining a dimension of the group of cells; and comparing the dimension with a debris threshold dimension; wherein, if the dimension is below the debris threshold dimension, setting a value of the cells such that, when the matrix is converted to a digital image, the debris pixels have a colour that is a colour of a background of the digital image.

According to a fifth aspect, there is provided a method of adjusting the page orientation of a digital image of a musical score comprising: converting the digital image into a matrix in which at least one cell of the matrix corresponds to a pixel of the digital image; setting the at least one cell of the matrix to a first value if the corresponding pixel of the digital image has a pixel intensity above a threshold intensity; identifying cells of the matrix corresponding to line pixels, the line pixels corresponding to a line of a stave; determining an angle between the line of the stave and an edge, such as a top, bottom or side edge, of the digital image; rotating the digital image by the angle.

Optionally, determining an angle between the line of the stave and the top of bottom edge of the digital image comprises determining an angle between more than one line of the stave and the top or bottom edge of the digital image.

Optionally, the angle is an average or median angle.

According to a sixth aspect, there is provided a method of re-engraving a digital image of a musical score comprising: identifying a line of a stave or a stem of a note in accordance with the method of the first aspect; identifying a musical character in accordance with the third aspect; creating a digital file comprising data corresponding to: the line of the stave or the stem of the note, and the musical character.

According to a seventh aspect, there is provided a method of re-engraving a digital image of a musical score comprising: identifying a line of a stave in accordance with the method of the second aspect; identifying a musical character in accordance with the third aspect; creating a digital file comprising data corresponding to the line of the stave and the musical character.

The method of the sixth and seventh aspects may further comprise removing debris from the digital image of the musical score in accordance with the fourth aspect.

The method of the sixth and seventh aspects may further comprise adjusting the page orientation of the digital image of the musical score in accordance with the fifth aspect.

Optionally, in the method of any preceding aspect the pixel density of the digital image is increased prior to converting the digital image into a matrix.

The method of any preceding aspect may further comprise: identifying two diagonally connected cells having the first value; identifying a weak-link cell, wherein the weak-link cell is a cell directly adjacent to both of the two diagonally connected cells; and setting the weak-link cell to the first value.

Optionally, in method of any preceding aspect the weak-link cell has a cell value equal to a cell value of cells corresponding to a background colour of the digital image.

Identifying musical notation in a digital image of a musical score, also known as sheet music, is desirable as it enables the removal of artefacts from the digital image creation process, improving the visual appearance of the score. The ability to re-engrave a musical score is highly desirable as it allows the score to be converted it into a high quality digital format rich in meta data. Once the score has been processed, the result is a clean, clear and enduring musical score optimised for digital delivery that is easy to search, annotate and navigate.

BRIEF DESCRIPTION OF FIGURES

Embodiments of the invention will now be described by way of example with reference to the drawings of which.

DETAILED DESCRIPTION

The aspects disclosed herein relate to automatically analysing a digital image of a musical score. An original musical score, from which the digital image is produced, may have been printed or handwritten and the digital image obtained by methods such as scanning or photographing a hard copy of the original musical score. Alternatively, the original musical score may have been produced digitally, using computer software, to produce a digital original which is subsequently converted into a digital image of a musical score or may already be a digital image of a musical score. The digital image of a musical score may be an image file encoded using any file format such as bitmap (.bmp), jpeg (.jpg), graphics interchange format (.gif), tagged image file format (.tiff) or portable network graphics (.png), for example.

Figure 1:
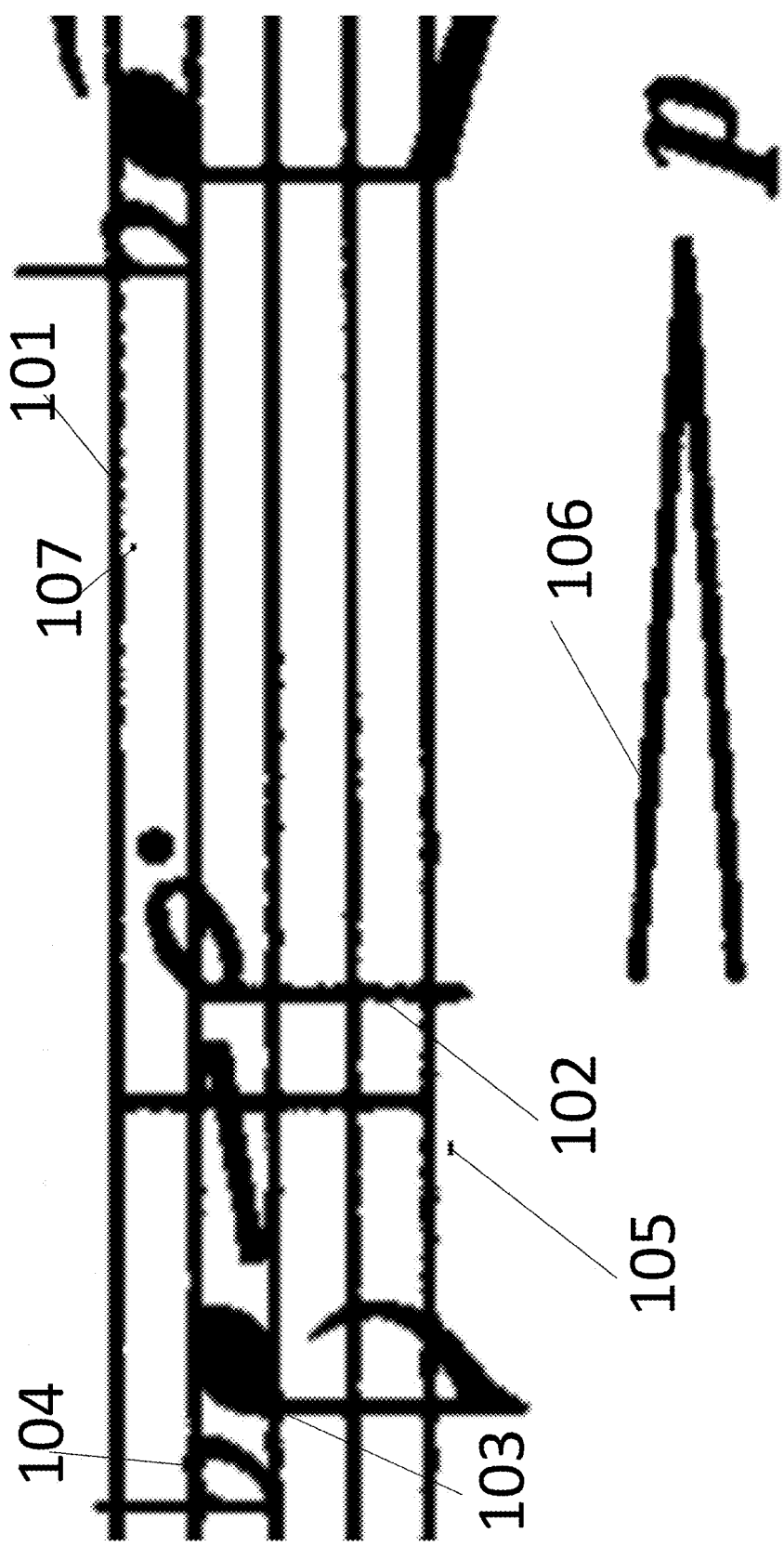
FIG. 1 illustrates an example of a musical score.

The digital image is therefore of a musical score, also known as sheet music, musical tablature or written music, an example of which is illustrated in FIG. 1. FIG. 1 illustrates a line of stave 101, a stem of a note 102, a note 103, a flat symbol 104 and a decrescendo symbol 106, wherein the note 103, flat symbol 104 and decrescendo symbol 106 are examples of musical characters. Musical characters may also be termed musical symbols. A musical score therefore depicts musical characters or symbols that represent the music. For example, they indicate the pitches, rhythms and/or chords of a song or instrumental musical piece. Further examples of musical characters include, but are not limited to, clefs, rests, breaks, time signatures, note relationships such as beams, ties, glissandos and tuplets, dynamics such as piano and forte, articulation marks, ornaments, octave signs, repetitions and codas. Furthermore, a musical character be comprised of individual component parts. For example, a double note, which is a musical character, may comprise a beam and two note heads, each of which is also a component part of a musical character.

In any of the aspects disclosed herein, as a first step the digital original or original musical score may be divided into individual pages before being converted into a digital image of a musical score. The resolution or pixel density of the digital image of a musical score may thereafter be increased, for example from 500 by 500 pixels to 1000 by 1000 pixels or to any other number of pixels, to provide an improved digital image of a musical score that allows more control over the pixel distribution in subsequent steps and improves the accuracy of the disclosed methods, although this step may not be necessary. The resolution may be increased using conventional methods, such as resampling or nearest-neighbour interpolation where every pixel is replaced with multiple pixels of the same colour, that are well known to the skilled person. The general term "digital image" or "digital image of a musical score" will be used to refer to both the digital image of a musical score or the improved digital image of a musical score.

The digital image is converted into a matrix by setting one or more cells of the matrix to a first value if a corresponding pixel of the digital image has a pixel intensity above a threshold pixel intensity. The term matrix means an array of values, quantities or expressions in rows and columns, as would be understood. The matrix comprises cells, where each cell has a coordinate defined by its row and column.

A matrix with the same dimensions as the digital image is created (i.e. the same number of rows and columns of matrix cells as rows and columns of pixels in the digital image). Pixels of the digital image may comprise data encoding one or more of colour, brightness, transparency or other attributes. Such data will be referred to as "pixel intensity" from hereon. Each pixel (after increasing the image resolution if needed) corresponds to a cell of the matrix. Next, the pixel intensity of a single pixel is compared against a threshold value and, if the data is above this threshold value, a cell of the matrix corresponding the pixel is set to a first value. In order to aid explanation of this step, a bitmap image with dimensions of 1000 by 1000 pixels will be used as an example. Each pixel has red, green and blue intensity values, where each colour has an 8-bit colour depth, for example. If any of the red, green or blue values are above an intensity of, for example, 100 (where the minimum value is 0 and the maximum 255, as would be understood), the corresponding cell in the matrix is set to the first value, such as a value of 1. Otherwise, the cell is set to a different value, such as a value of 0. In subsequent examples, cells with a value set to the first value (corresponding to pixels with an intensity at or above a threshold value) may be referred to as black cells. Cells referred to as white cells in subsequent examples are cells that correspond to pixels in the image of a musical score with a pixel intensity below the threshold value.

This process is repeated for the entire digital image, although it is not necessary to convert the entire image to a matrix. The resulting matrix has the same dimensions as the digital image (e.g. 1000 by 1000 cells) and directly represents the pictorial data of the digital image. In the above example, the resulting matrix is a binary matrix as all of the cells have a value of either 1 or 0, however, the cell values do not need to be limited to binary values. The example binary matrix is essentially a black and white representation of the digital image in rows and columns. The resulting matrix may be rotated in subsequent steps. If the matrix is rotated, the following descriptions of column and rows would be switched, as would be understood.

As part of the steps of the methods of the following aspects, cell values may be changed to represent different cell types. As will be explained, possible cell types that will be explained later include: linked cells; cells that are part of a chain of cells, known as chain cells; cells in a horizontal or vertical group of chain cells, known as horizontal or vertical group cells, respectively; cells that define the contours of the group of chains of cells, known as contour cells; cells corresponding to a line of a stave, known as stave cells; cells corresponding to a stem of a note, known as stem cells; cells corresponding to a split end, known as split end cells; top, bottom, left and right split end cells; cells corresponding to an object contour, known as object contour cells; cells corresponding to an object hole contour, known as object hole contour cells; and cells inside object contour cells, known as filled cells. Each cell type is given a unique value to identify it, for example, linked cells are given a value of 2, chain cells are given a value of 3, and so on. Any value or type of value (for example an alpha-numeric value) may be given as long as each cell type corresponds to a unique value not shared with other cell types.

Further, each cell type has a corresponding parsed cell type, which the cell is updated to after being parsed. For example, these cell types are referred to as parsed white cells, parsed black cells, parsed linked cells, and so on. Any value or type of value (for example an alpha-numeric value) may be given to a parsed cell type as long as each cell type and parsed cell type corresponds to a unique value not shared with other cell types.

Figure 20:
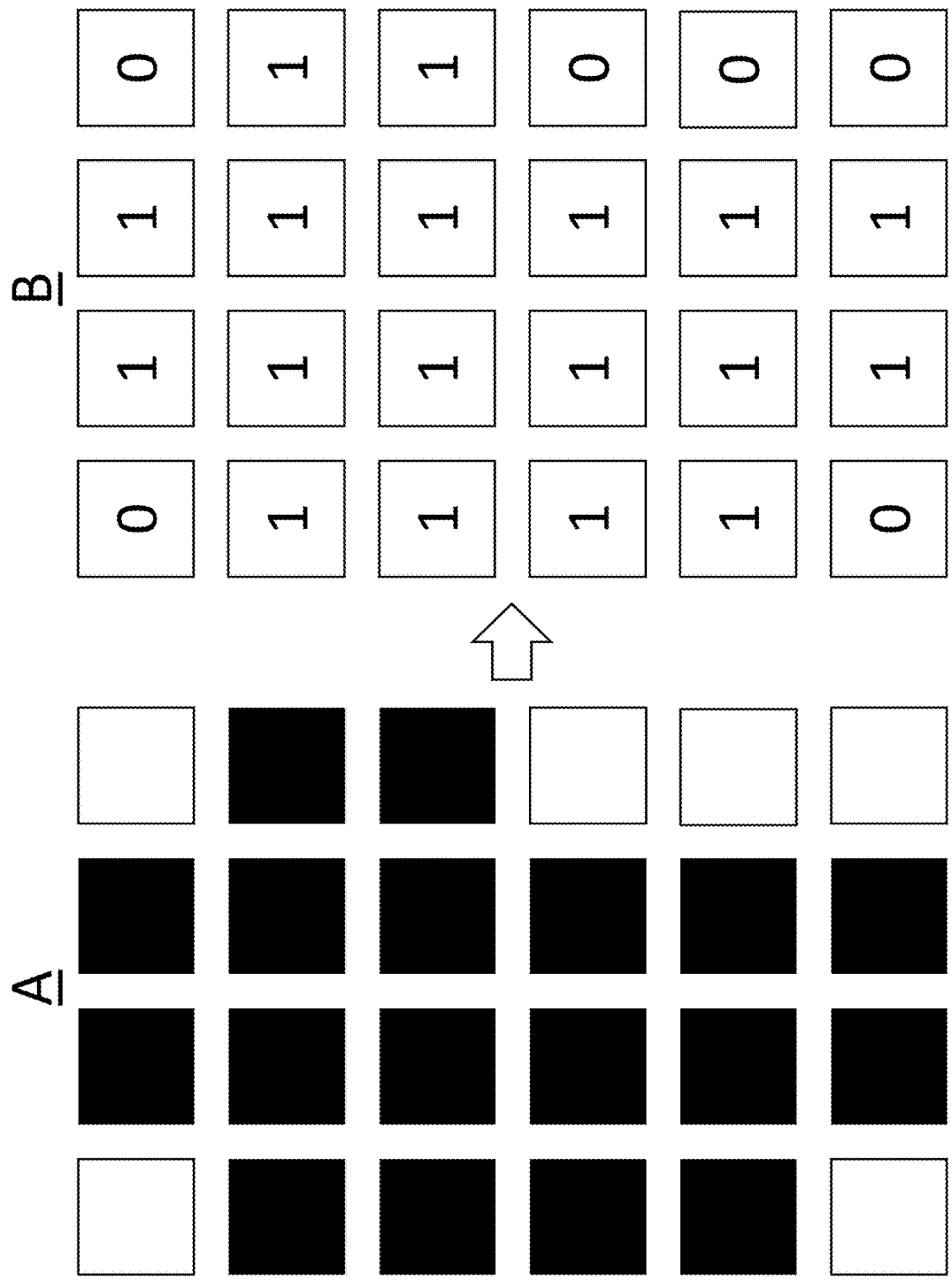
FIG. 20 illustrates part of a digital image that is four pixels wide and six pixels high.

An example of how a digital image is converted into a matrix will now be given with reference to FIG. 20, which illustrates part of a digital image for example purposes that is four pixels wide and six pixels high (FIG. 20A). Accordingly, the corresponding matrix (FIG. 20B) is also four cells wide (has four columns) and six cells high (has six rows). In this instance, the digital image is a black and white image where every pixel is either black or white. Each white pixel has a pixel intensity below a threshold value and each corresponding cell ("white cells") is given a value of 0. Each black pixel has a pixel intensity above the threshold value and each corresponding cell ("black cells") is given a value of 1.

For clarity, in the matrices illustrated in FIGS. 4, 5, 6, 8, 10, 11, 12, 13, 15, 16, 17, 18, 21, 23 and 24, white, black and shaded or hatched squares or regions are used to represent the cell values of cells. This is for ease of understanding and visual representation and to help show how the cells of the matrix correspond to pixels of the digital image.

Figure 4:
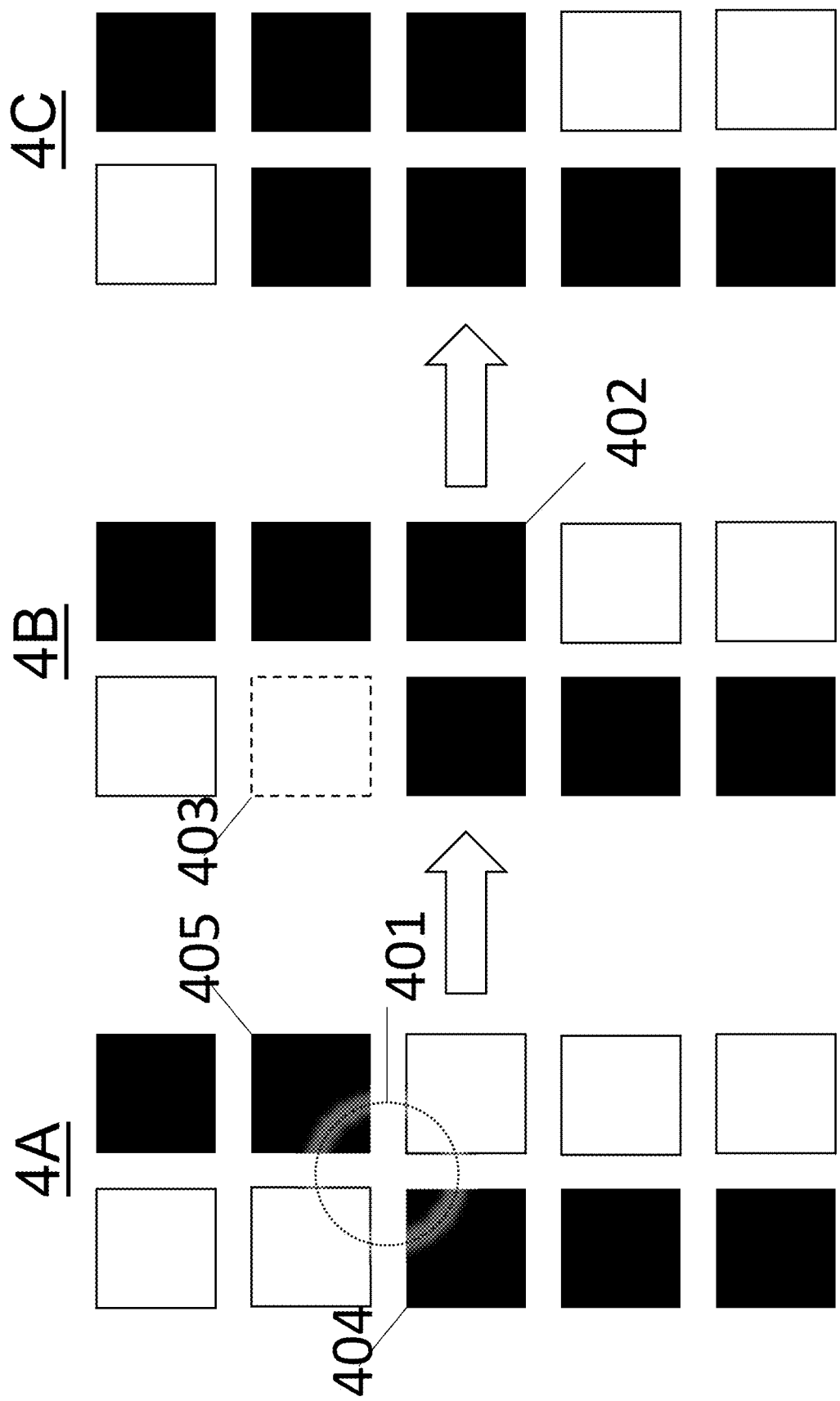
FIG. 4 illustrates a method of strengthening a weak connection between cells.

A matrix may comprise "weak connections" which may be "strengthened". Two cells of a matrix both having the first value that are diagonally adjacent, where the cells either side of the diagonal connection (i.e. the opposite diagonal to that having the first values) do not have the first value, are described herein as having a "weak connection" 401. Weak connections may represent a decrease in quality from the original score to the digital image, through poor scanning quality or low resolution of the digital image or for other reasons. For example, the original score itself may not be of high quality. Weak connections may be "strengthened" in order to help avoid tracing errors and/or contour identification errors in subsequent steps, as described later. FIG. 4 illustrates a method of strengthening a weak connection between cells. FIGS. 4A, 4B and 4C each correspond to a part of a matrix, the part comprising two columns and five rows.

FIG. 4 illustrates a matrix where black squares represent black cells (with the first value) and white squares represent white cells. FIG. 4A shows an example weak connection. As shown in FIG. 4A, one black cell 404 has a white cell one column to its right, and a white cell one row up. However, it is diagonally adjacent to black cell 405. A weak connection 401 is present between cells 404 and 405 of FIG. 4A. The weak connection may be strengthened by converting the weak-link cell 402 to a black cell (i.e. corresponding to a pixel with a pixel intensity above the threshold value), as shown in FIG. 4B. In other words, a cell creating a L-shape with the cells forming the weak connection may be converted. Alternatively, weak-link cell 403 can be converted to a black cell.

The connection may be further strengthened by converting both weak-link cell 403 and weak-link cell 402 to black cells (FIG. 4C).

Furthermore, rows and/or columns of black cells that are one cell thick (i.e. correspond to horizontal and/or vertical straight lines in the digital image with a thickness of only one pixel) may also be strengthened. For example, this process involves identifying a one-cell-thick column and/or row of black cells and increasing the thickness of the row or column to two or more black cells by replacing one or more white cells directly next to each black cell with a black cell.

In summary, strengthening of weak links may comprise identifying two diagonally connected cells having the first value; identifying a weak-link cell 402, 403, wherein the weak-link cell 402, 403 is adjacent to both of the diagonally connected cells and does not have the first value; and setting the weak-link cell 402, 403 to the first value.

First Aspect

Figure 3:
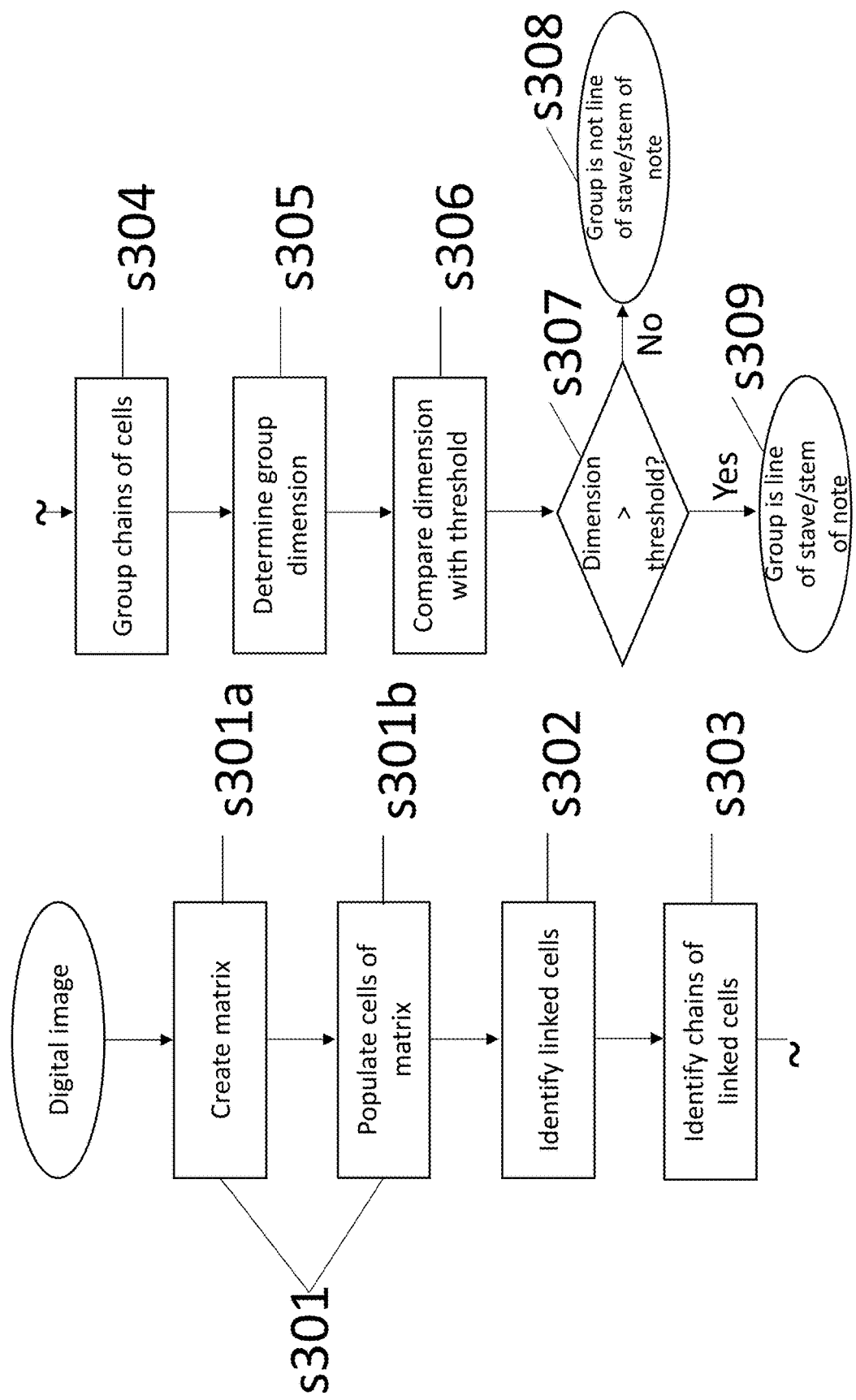
FIG. 3 illustrates a flow diagram of the steps for identifying a line of a stave in a musical score.

A first aspect disclosed herein is a method of identifying a line of a stave or the stem of a note in a digital image of a musical score. A flow diagram illustrating steps of the method is shown in FIG. 3.

At step s301, the digital image, which may be the digital image of a musical score or improved digital image of a musical score as previously explained, is converted into a matrix. Step s301 is split into two parts: s301a and s301b. At step s301a, a matrix with the same dimensions as the digital image is created and at step s301b, the pixel intensity of a single pixel is compared against a threshold value and, if the data is above this threshold value, a cell of the matrix corresponding the pixel is set to a first value, as previously explained.

At step s302, adjacent black cells are identified as linked cells, the adjacent cells corresponding to pixels being adjacent in one of a horizontal direction or a vertical direction of the digital image. As will be discussed further below, adjacent cells corresponding to pixels being adjacent in a horizontal direction are used to identify a line of a stave in a digital image of a musical score while adjacent cells corresponding to pixels being adjacent in a vertical direction are used to identify a stem of a note in a digital image of a musical score. In this instance, the term "adjacent cells" means directly adjacent cells along a line that is parallel or perpendicular to the bottom of the page. Thus, adjacent cells exclude diagonally adjacent cells.

Figure 5:
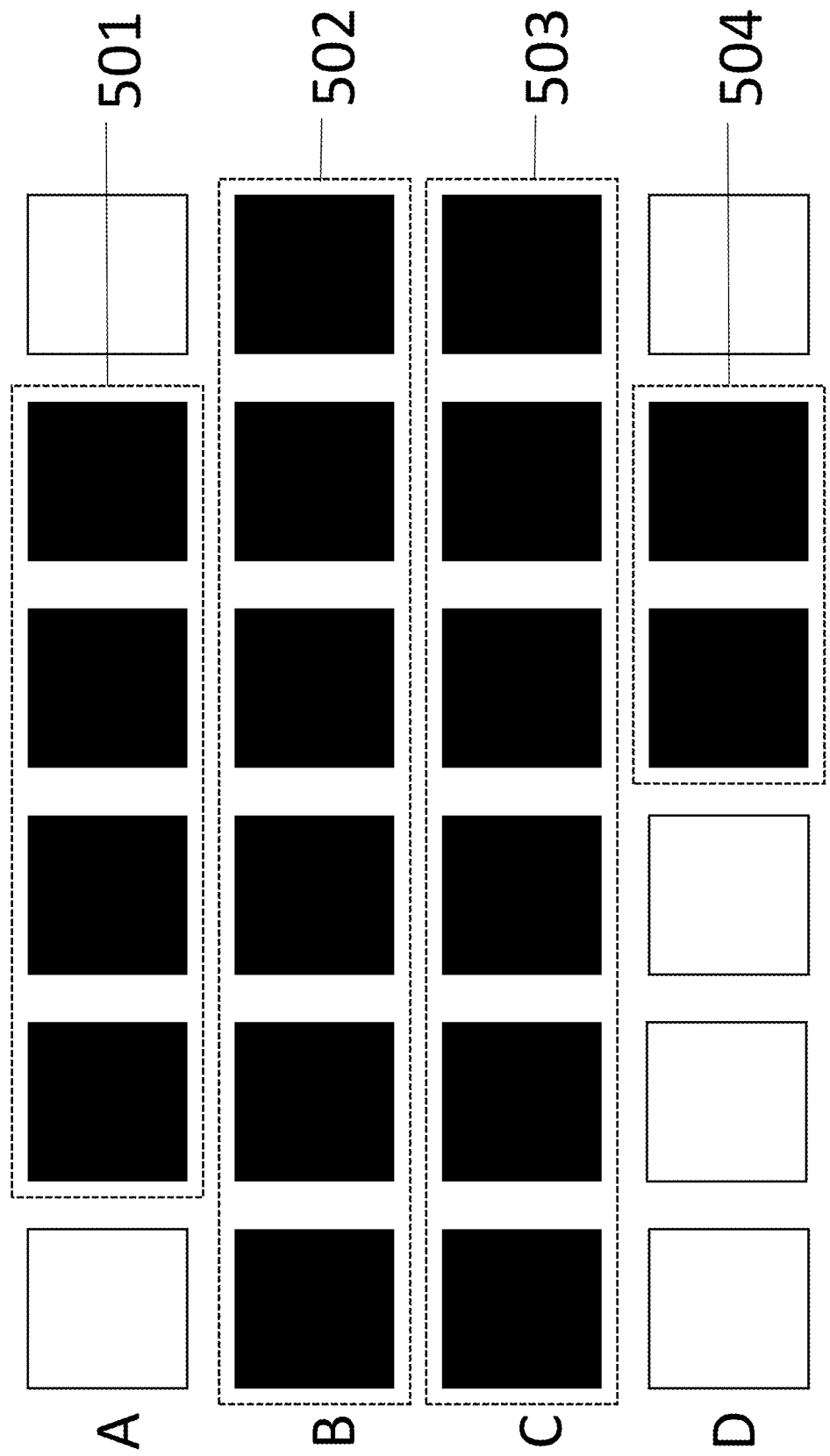
FIG. 5 illustrates an example of chains of cells.

FIG. 5 illustrates cells of a matrix where black squares represent black cells of the matrix corresponding to pixels with a pixel intensity above the threshold value and the white squares represent white matrix cells corresponding to pixels with a pixel intensity below the threshold value. Using FIG. 5 as an example, the black cells in rows A, B, C and D correspond to pixels that are adjacent in a horizontal direction of the digital image. Thus, the cells in boxes 501, 502, 503 and 504 are identified as linked cells. The cell values of cells identified as linked cells may be updated to reflect that the cells are linked cells i.e. they may be given a different value in the matrix indicating that the cell is a linked cell.

At step s303, linked cells comprising a number of cells exceeding a threshold number in a horizontal (identifying a line of a stave) or vertical (identifying a stem of a note) direction are identified as a horizontal or vertical chain respectively. Using FIG. 5 as an example, if the threshold is three, the cells in boxes 501, 502 and 503 are each identified as cells forming part of a horizontal chain while the cells in box 504 are not identified as cells forming part of a horizontal chain. The threshold may be a pre-defined threshold, for example 100 pixels and/or at least 90% of the width of the digital image for identifying a line of a stave or 50 pixels and at least 5% of the height of the digital image for identifying a stem of a note, or it may be determined dynamically based on the distribution of the lengths of the linked cells in the matrix, for example by identifying all potential chains and setting the threshold as a percentage of the average length of the chains. The cell values of cells forming part of a chain of cells may be updated to reflect that the cells are part of a chain of cells i.e. they may be given a different value, such as the chain cell value, in the matrix indicating that each cell is part of a chain of cells.

Figure 6:
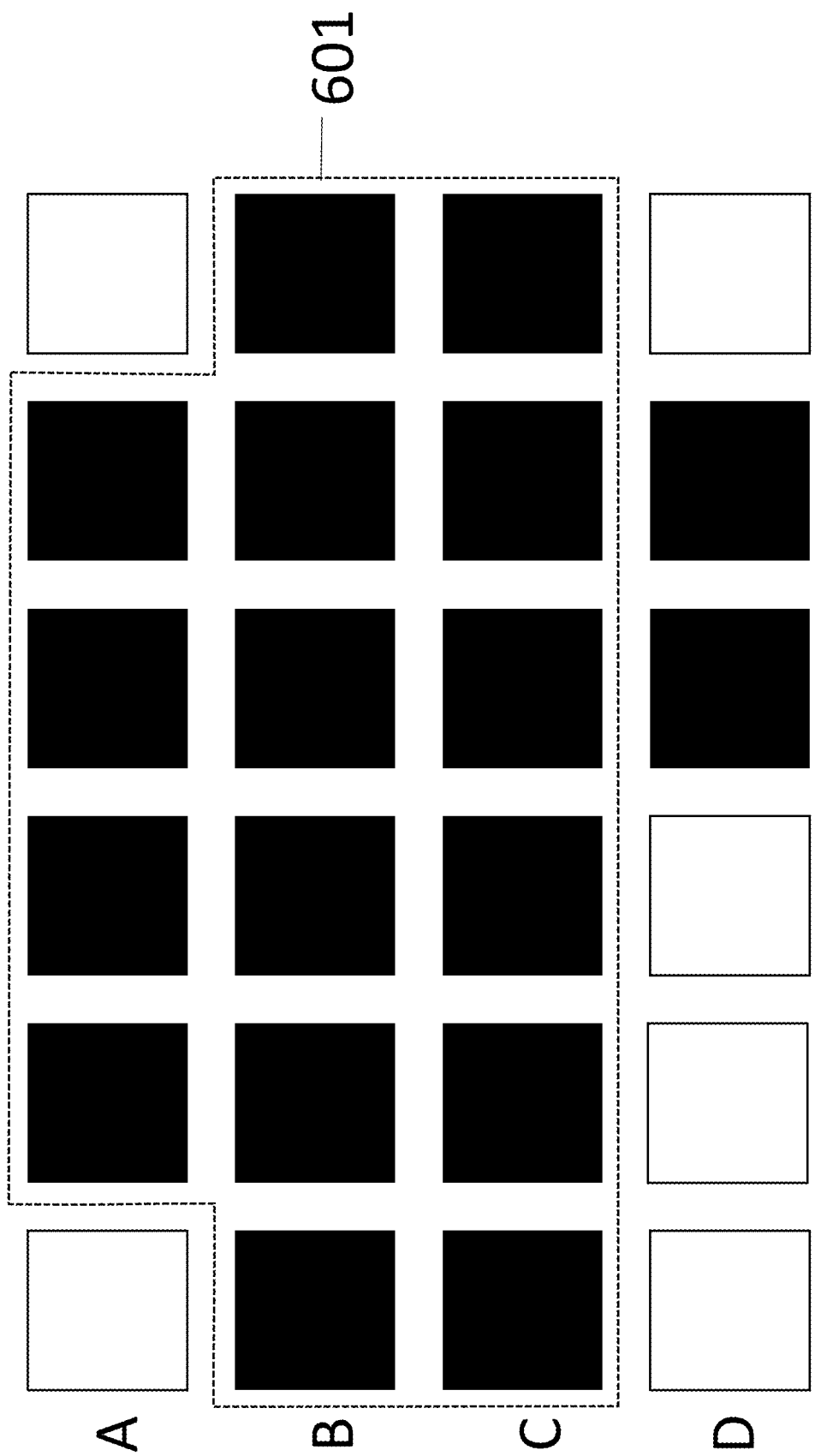
FIG. 6 illustrates an example of a group of chains.

At step s304, chains of cells are grouped into a group of chains. For example, directly adjacent horizontal or vertical chains may be grouped to create a horizontal or vertical group of chains respectively. Their cell value is updated accordingly, for example to the horizontal group cell value or the vertical group cell value, respectively. Continuing with the above example, the horizontal chains of cells in boxes 501, 502 and 503 in FIG. 5 may be grouped into a horizontal group of chains 601 as illustrated in FIG. 6. All cells that are not grouped into a group of chains in step s304 are set to white cells.

At step s305, a dimension of the group of chains is determined. For example, the dimension might be the maximum height and/or maximum width. Using the group of chains 601 in FIG. 6 as an example, the maximum width of the group is six cells and maximum height is three cells. Particularly, determining a dimension of the group of chains may be determining a dimension of a bounding box of the group of chains.

Figure 7:
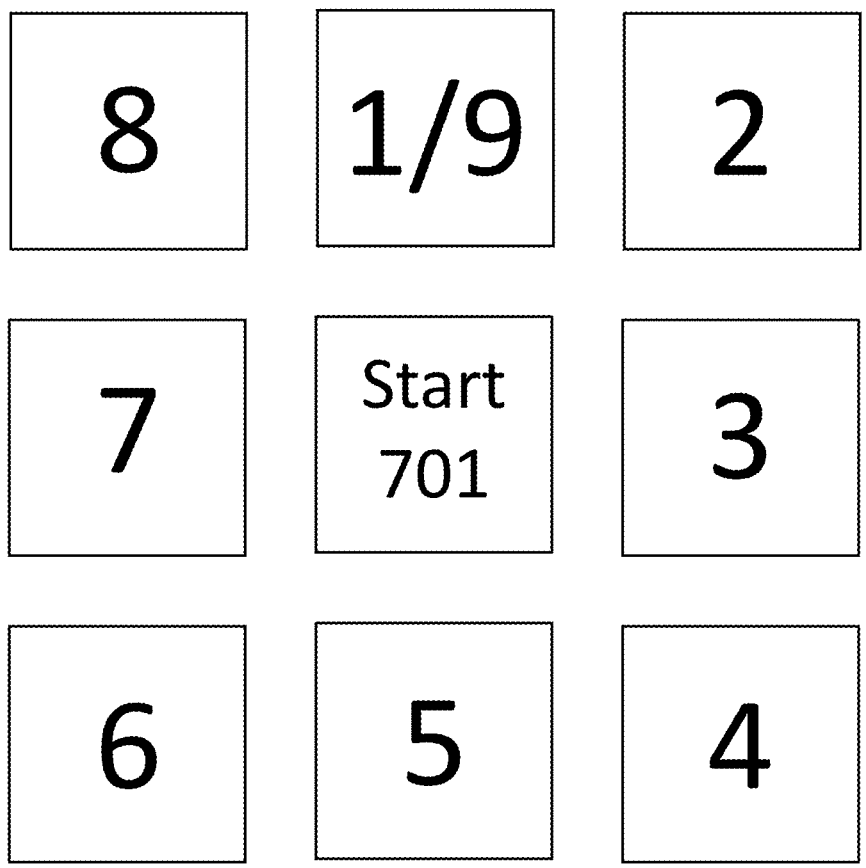
FIG. 7 illustrates an example of a cell crawl path.

An example of how a bounding box may be determined will now be given. Cells that define the contours of the group of chains, referred to as contour cells, are determined. The contour cells are those cells located on the perimeter of the group of chains. A pre-defined route theory may be applied to crawl through the matrix to identify the edge or perimeter of the group of cells. As an example, the cells of the matrix take one of three values referred to as white (cells corresponding to pixels with a pixel intensity below the threshold value), horizontal group or vertical group cells (cells that have been identified as a horizontal or vertical group of chains) and contour (cells that form the contour of the group of chains). An example of code written in C# for a crawl path is given below.

int[,]ScanPathController=new int[,]{{-1,0},{0,1},{1,
       0},{1,0},{0,-1},{0,-1},{-1,0},{-1,0},{0,1}};

FIG. 7 illustrates an example crawl path, wherein the numbers indicate the order in which cells are parsed. Beginning at central start cell 701, as illustrated in FIG. 7, the value of each cell around start cell 701 is read in turn. In this instance, a clockwise path is described moving from cell 1/9 to 2 to 3 etc. before ending in 1/9; however, any suitable crawl path may be used. Using this route theory, if the central cell is a horizontal group or vertical group cell and if any of the cells surrounding the start cell are white cells, then the start cell 701 must be a contour cell. Cells identified as contour cells are updated with the contour value, otherwise they are left with their current value or set to their corresponding parsed value, e.g. parsed horizontal group or vertical group cell value, to indicate that they have been parsed to avoid being reparsed. As would be understood, other methods and code may be used to crawl cells, and the method described herein is merely an example.

Alternatively, the path may be used to find all black cells in the path, wherein as soon as a black cell is found, the central start cell 701 is moved to that cell and the scan path is followed again.

Figure 8:
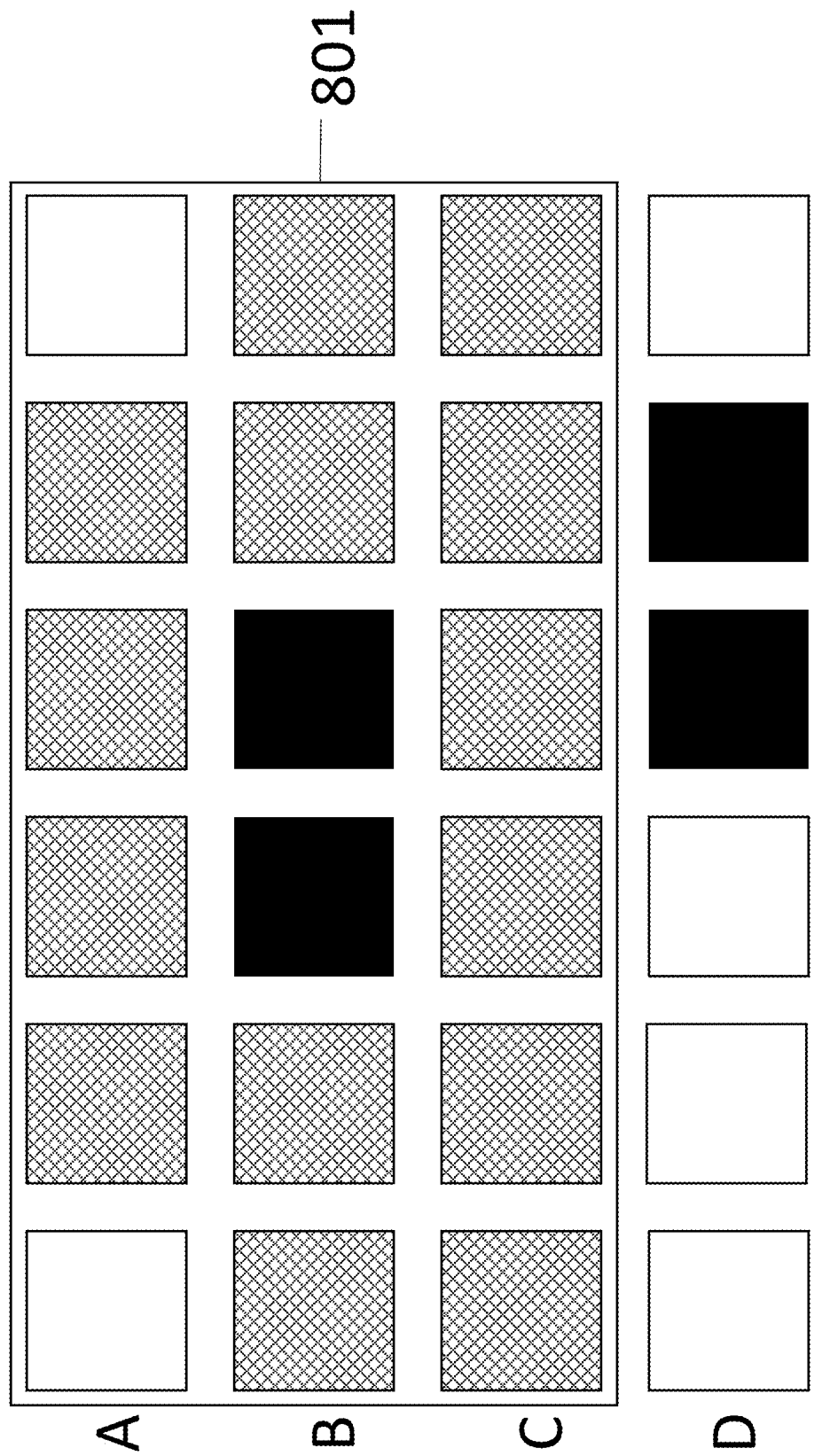
FIG. 8 illustrates contour cells of an example of a group of chains.

FIG. 8 illustrates the contour cells of the group of chains 601 illustrated in FIG. 6 where the hatched squares represent contour cells.

A bounding box encompassing the contours may be determined from the coordinates of the contour cells. The coordinates of the contour cells may be collected in an array depicting row and column references of each contour cell. A bounding box (characterised by four cell coordinates) encompassing the contour cells may be identified using the coordinates of the contour cells. The area of the bounding box may be minimised to find a minimum bounding box 801 by iterating through all of the edges of the convex hull (i.e. the smallest set of cells) bounding the contour cells, as would be understood. The minimum bounding box defines the minimum area encompassing all of the contour cells. Indeed, any bounding polygon or minimum bounding polygon may be calculated instead, and is not necessarily limited to a bounding box.

The minimum bounding box 801 of the group of chains 601 of FIG. 6 is shown in FIG. 8.

Therefore, at step s305, at least one dimension of the group of chains or bounding box or minimum bounding box is calculated using the method described above.

If the method is being used to identify a line of a stave, the preferred dimension of the bounding box or minimum bounding box is the width, where the width corresponds to the dimension of the matrix that corresponds to the left-to-right direction of the digital image of a musical score, i.e. the direction in which the music would be read, when orientated in the conventional manner for a musical score.

If the method is being used to identify a stem of a note, the preferred dimension of the bounding box or minimum bounding box is the height, where the height corresponds to the dimension of the matrix that corresponds to the vertical direction of the digital image of a musical score when orientated in the conventional manner for a musical score.

Pixels corresponding to a line of a stave or stem of a note may be collectively referred to as line pixels and cells corresponding to line pixels are stave cells or stem cells.

At step s306/s307 the dimension is compared with a dimension threshold. The dimension threshold may be a predetermined threshold, for example, the dimension threshold may be 100 pixels and/or at least 90% of the width of the digital image for identifying a line of a stave or 50 pixels and at least 5% of the height of the digital image for identifying a stem of a note, Alternatively, the dimension threshold may be a dynamic dimension threshold. The dynamic dimension threshold may be calculated by identifying multiple dimensions (of multiple groups of chains) in the image of a musical score and calculating the dynamic dimension threshold based on the distribution of dimensions. For example, if linked cells are adjacent cells corresponding to pixels being adjacent in a horizontal direction of the digital image, the distribution of dimensions will usually have a narrow peak at, for example, a value greater than half the width of the matrix. This peak corresponds to the longest dimension of the lines of the stave in the digital image. The dynamic threshold can be set just below this peak in order to ensure that only a line of a stave and not a different line is determined to be a line of a stave. This also applies, mutatis mutandis, when using the method to identify a stem of a note. The benefit of using a dynamic dimension threshold is that the threshold will more reliably scale with the dimensions of the stave lines or stem lines of the particular digital image. Alternatively, the threshold may be a percentage of the average length of all the groups of chains.

If the dimension is above the dimension threshold, the method proceeds to step s309 in which pixels corresponding to linked cells of the group of chains are determined to correspond to 1) a line of a stave if the adjacent cells correspond to pixels being adjacent in a horizontal direction of the digital image, or 2) a stem of a note if the adjacent cells correspond to pixels being adjacent in a vertical direction of the digital image.

As the line of a stave runs horizontally across a musical score, if the linked cells correspond to pixels that also run horizontally across the digital image of a musical score, it is assumed that the pixels correspond to a line of a stave. As a dimension of the cells/pixels is above a threshold dimension, and the longest horizontally orientated object in a musical score is the line of a stave, again it may be assumed that the pixels correspond to a line of stave.

As the stem of a note runs vertically up and down a musical score, if the linked cells correspond to pixels that also run vertically up and down the digital image of a musical score, it is assumed that the pixels correspond to the stem of a note. As a dimension of the cells/pixels is above a threshold dimension, and the longest vertically orientated object in a musical score is the stem of a note, again it may be assumed that the pixels correspond to a stem of a note.

The value of cells of the matrix identified as corresponding to the pixels that are part of a line of a stave or a stem of a note may be updated to reflect that they correspond to the line of a stave or a stem of a note respectively, i.e. the stave cell or stem cell value. Alternatively, the values of these pixels be set to a value that is not the first value e.g. a value indicating that the cell corresponds to a pixel with a pixel intensity below the threshold intensity.

The coordinates of pixels determined to correspond to a line of a stave or a stem of a note, or the coordinates of bounding boxes, may be stored for use in: identifying a musical character in a musical score; removing debris from a digital image of a musical score; adjusting the page orientation of a digital image of a musical score or re-engraving a digital image of a musical score, as described below.

If, after s307, the dimension is not above the dimension threshold, the method proceeds to step s308 in which pixels corresponding to linked cells of the group of chains are not determined to correspond to a line of a stave or the stem of a note.

Second Aspect

A second aspect disclosed herein is a method of identifying a line of a stave in a digital image of a musical score. The method of the second aspect works on the assumption that if a row of a digital image comprises a large number of black pixels (or pixels with an intensity above a threshold intensity) then the pixels in the row are part of a line of a stave, as rows comprising a line of a stave predominantly comprise black pixels while rows that predominantly comprise white pixels would not comprise a line of a stave. Thus, the method of the second aspect is based on determining the number of pixels with an intensity above a threshold intensity in a row of pixels in a digital image of a musical score and determining that the pixels correspond to a line of a stave if the number of pixels is above a threshold number.

The method of the second aspect will now be explained in detail.

A digital image of the second aspect is the same as a digital image described above.

The digital image in converted into a matrix in which at least one cell of the matrix corresponds to a pixel of the digital image, and at least one cell of the matrix is set to a first value if the corresponding pixel of the digital image has a pixel intensity above a threshold intensity, as explained above.

Next, the matrix is iterated through to determine the total number of black cells in at least one row of cells. That is to say that the number of cells with the first value in a row of the matrix is determined. If the total number of cells with the first value in the row is above a threshold value, it is determined that cells with the first value in the row of the matrix correspond to a line of a stave.

Optionally, the digital image may be shrunk to a set proportion to create a shrunken digital image before being converted into a matrix. For example, the shrunken digital image may be at least two times smaller and preferably four times smaller than the digital image. Shrinking the digital image may repair deteriorated portions of the digital image, as would be understood.

When the matrix is iterated through to capture the total number of black cells in a row, the largest total number of black cells in a single row may also be determined during this iteration. Using the largest total value, the threshold may be calculated. For example, the threshold may be 70% of the largest total value. The row wise black cell count is then iterated and validated against the threshold. For rows that have a black cell count of more than or equal to the threshold, it is assumed that the black cells correspond to pixels of a line of a stave.

Alternatively, the threshold may be a fixed value or a percentage of the total number of cells per row, for example 60% of the number of cells per row.

Third Aspect

Figure 9:
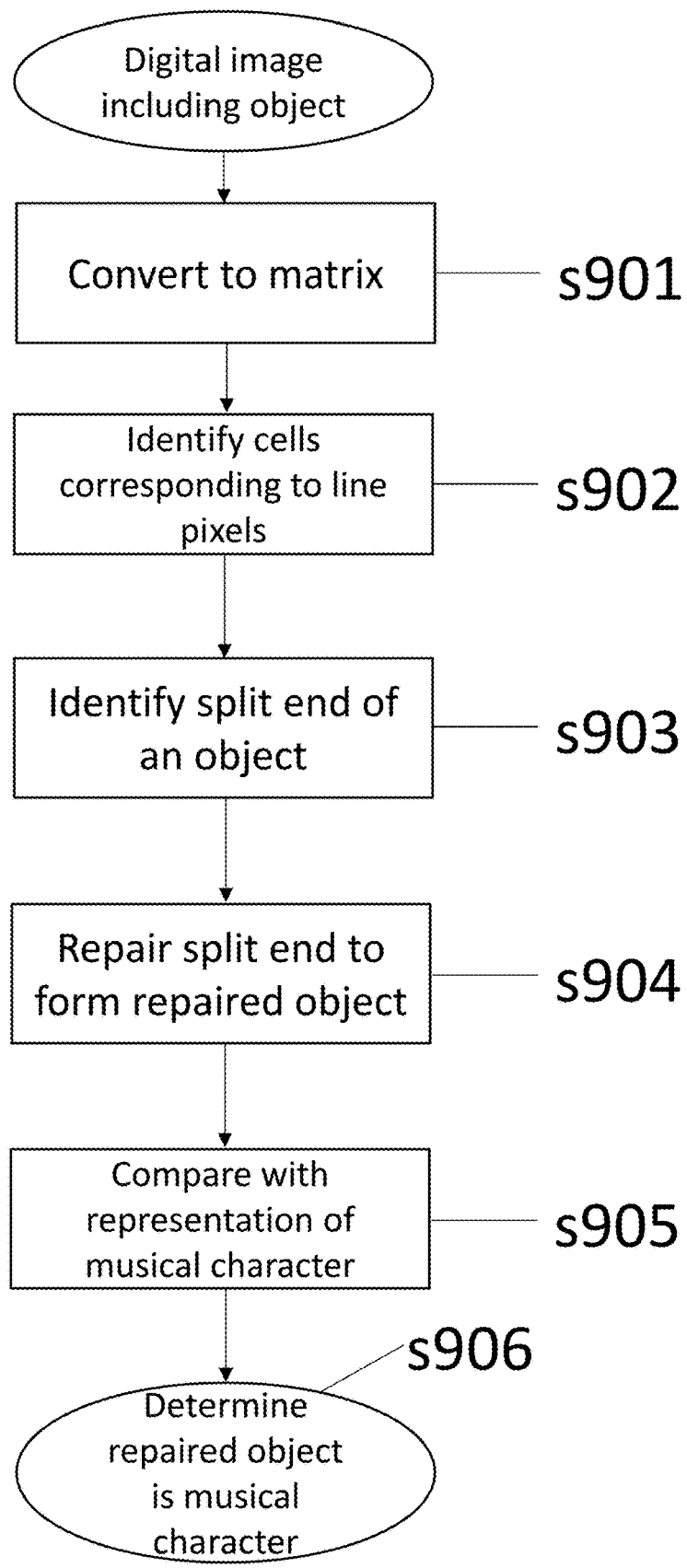
FIG. 9 illustrates a flow diagram comprising steps of a method of identifying a musical character in a digital image of a musical score.
Figure 10:
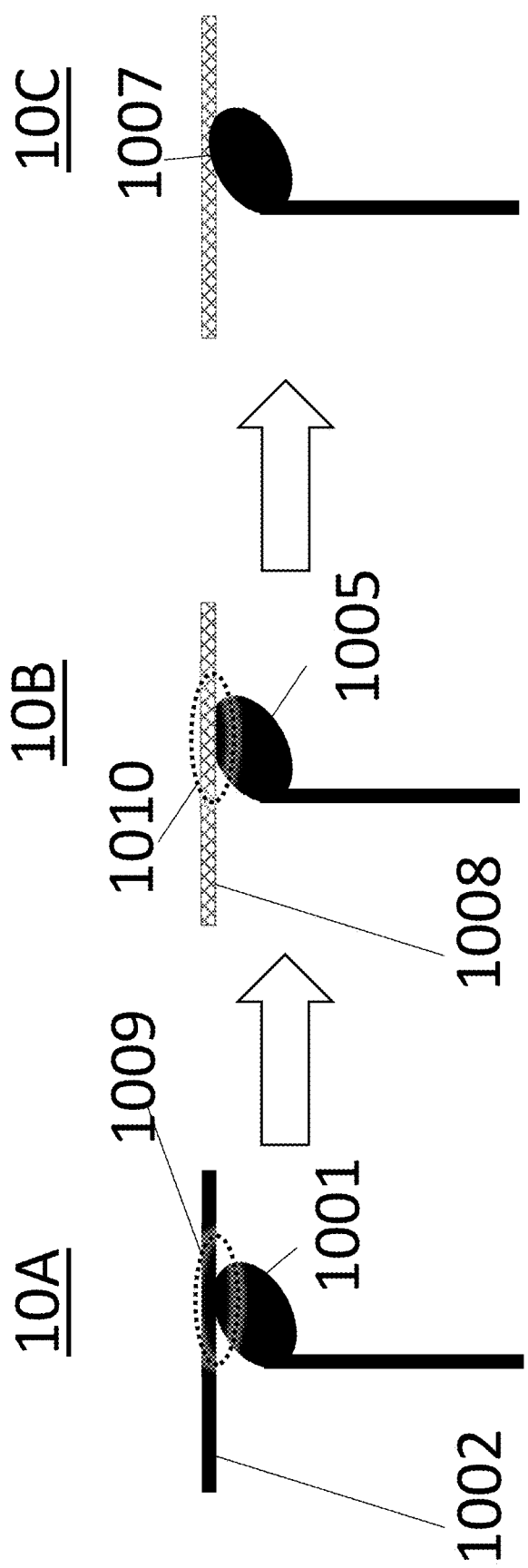
FIG. 10 illustrates an example of steps of a method of identifying a musical character in a digital image of a musical score.

A third aspect disclosed herein is a method of identifying at least a part of a musical character in a digital image of a musical score. A flow diagram showing steps of the method is illustrated in FIG. 9 and an example of part of the method is illustrated in FIG. 10.

At step s901 the digital image is converted into a matrix by setting one or more cells of the matrix to a first value if a corresponding pixel of the digital image has a pixel intensity above a threshold intensity, as explained above. FIGS. 10A, 10B are 10C each show a zoomed-out matrix wherein regions of like cells can be seen but individual cells of the matrix cannot be distinguished. Instead of cells with numerical values, each region of cells with the same value corresponds to a region of colour or a patterned region. Black regions correspond to regions of black cells that correspond to pixels above the threshold intensity. White regions correspond to white cells that correspond to pixels below the threshold intensity. The crosshatched regions correspond to regions of cells determined to correspond to a line of a stave.

FIG. 10A illustrates a matrix with cells corresponding to a note 1001 and a line of a stave 1002 in a musical score.

At step s902, cells corresponding to line pixels are identified, where line pixels are part of a line of a stave or stem of a note in the digital image. This may be done in accordance with the first aspect or second aspect of the invention or by any other means known to the skilled person.

As an example, a line of a stave is identified in accordance with the first aspect of the invention, wherein stave cells corresponding to a line of a stave are also cells corresponding to line pixels.

FIG. 10B illustrates cells that have been identified as a line of a stave 1008 represented by the cross-hatched region. The identified cells also correspond to line pixels. The cells that correspond to pixels that are part of the identified stave line 1008 (cross-hatched) are shown. These cells have had their cell values updated accordingly to indicate that they are part of a line of a stave. If the stave identification was performed as set out in the above first aspect, the values of such cells are the described stave values.

It can be seen in FIG. 10 that some cells correspond to pixels that are both part of the line of a stave 1002 and part of the note 1001, such as some of the pixels highlighted by the circle 1009 in FIG. 10A. As shown in FIG. 10B, the values of these cells are updated to represent that they are part of a line of a stave. This leaves cells corresponding to a note lower portion 1005 that do not correspond to the complete shape of the note 1001. The note lower portion 1005 is an example of an object. The term "object" means a group of directly adjacent cells having the first value, at least some of the cells of the group being directly adjacent to cells corresponding to pixels that form part of a line of a stave or a stem of a note in a digital image of a musical score.

As previously explained, the value of the cells of the matrix that correspond to the pixels that are part of a line of a stave may have a stave value indicating that they are part of a line of a stave. If the line of a stave is identified using a method of the first aspect described above, wherein a bounding box or minimum bounding box surrounding a group of chains has been calculated, all cells falling within the bounding box or minimum bounding box may have their value updated as above. Alternatively, all the cells of the group of chains may have their value updated to indicate that they are part of a line of a stave.

At step s903 a "split end" of an object in the digital image of a musical score is identified. A split end comprises a group of cells directly adjacent to a line of a stave or stem of a note, each cell in the group having the first value. The group of cells may be a line of cells or a straight line to cells. An object may have one split end, or it may have more. For example, the object may have two split ends.

An example of how a split end is identified will now be given. This is done by parsing cells of the matrix that have been set to the stave value or stem value indicating that the cells correspond to a line of a stave or stem of a note, respectively. An example of code for a crawl path for each cell is given below.

```
int[,]ScanPathController=new int[,]{{-1,0},{0,1},{1,
    0},{1,0},{0,-1},{0,-1},{-1,0},{-1,0},{0,1}};
```

This crawl path is shown in FIG. 7, as previously described. Beginning in central start cell 701, as illustrated in FIG. 7, the value of each cell around start cell 701 is read in turn. In this instance, a clockwise path is described moving from cell 1/9 to 2 to 3 etc. before ending in 1/9; however, any path may be used. Using this route theory, if the start cell is a stave cell or a stem cell and cells 1/9, 2 and 8 illustrated in FIG. 7 are black cells, then those cells correspond to a split end, specifically a bottom split end, and the cell values may be updated to a specific split end value. The split end corresponds to a bottom split end as there are black cells above the split end. The cell value is updated to represent that the cells correspond to a split end or a bottom split end. In other words, black cells in a directly adjacent row above the central start cell 701 correspond to cells of a bottom split end.

If cells 4, 5 and 6 are black cells, then those cells correspond to a split end, specifically a top split end, e.g., returning to FIG. 10B, the top of the note lower portion 1005, and the cell values may be updated to a specific split end value representing that the cells correspond to a split end or a top split end. In other words, black cells in an adjacent row below central start cell 701 correspond to cells of a top split end. The split end value for the bottom split end and the top split end may be the same, or may be different.

Similarly, if cells 6, 7 and 8 of FIG. 7 are black cells, then those cells correspond to a split end of an object, specifically a right split end of the object and if cells 2, 3 and 4 are black cells, then those cells correspond to a split end of an object, specifically a left split end of the object.

Figure 21:
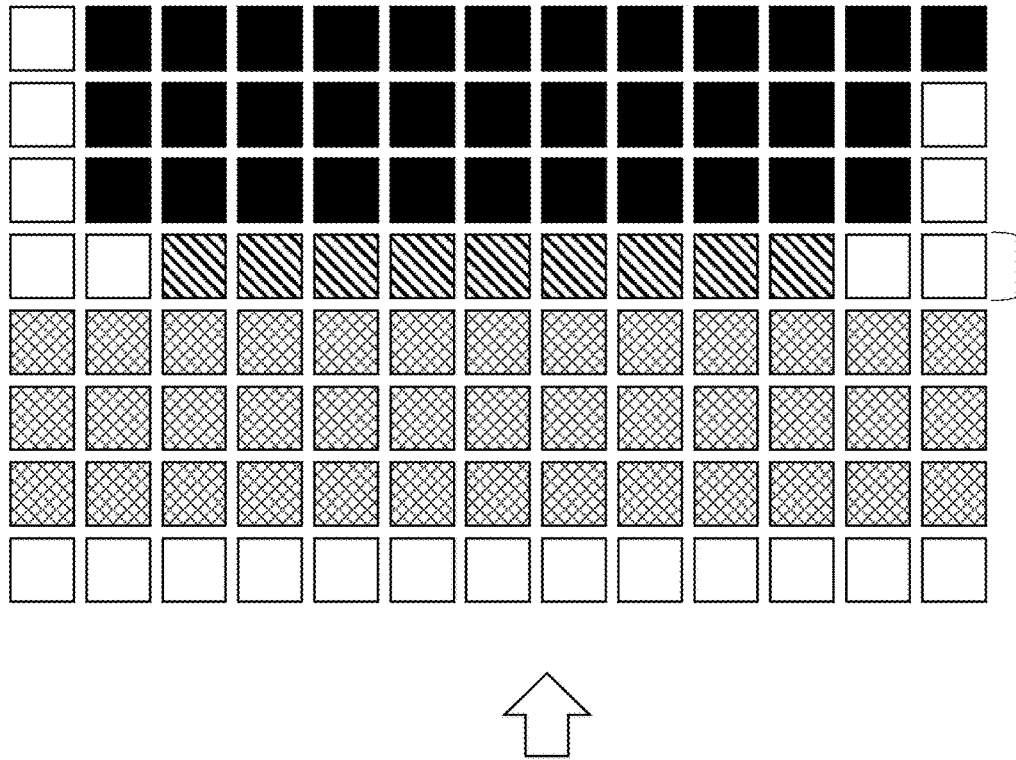
FIG. 21 illustrates a zoomed in portion of FIG. 10.
Figure 21:
Figure 21:
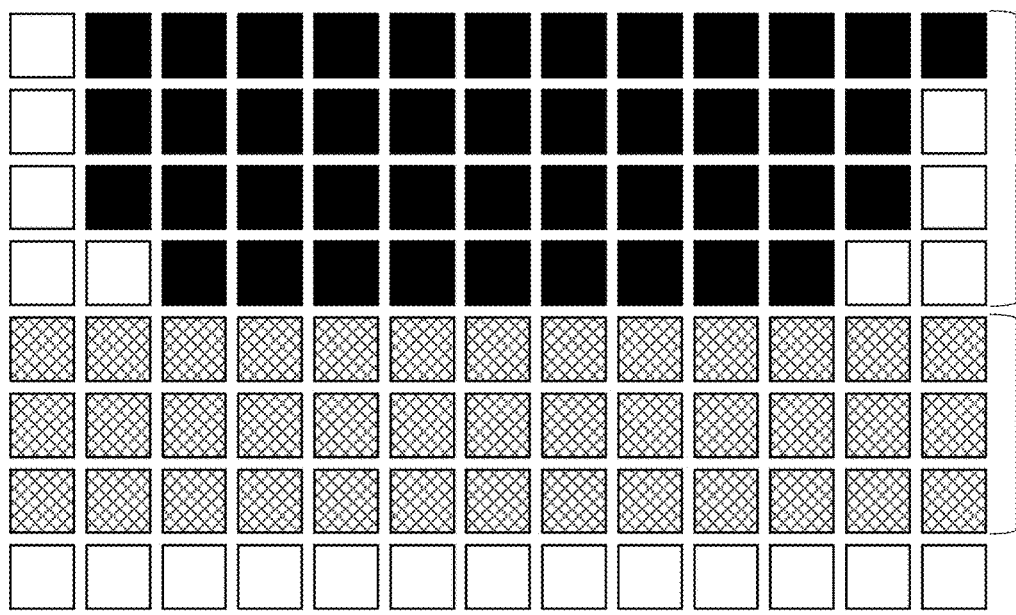

In the example illustrated in FIG. 10B, the pixels at the top of the note lower portion 1005, directly adjacent to those pixels having the stave value, are identified as a split end or top split end. The example object of FIG. 10B therefore has a top split end. A zoomed in illustration of the cells in circle 1010, but rotated 90 degrees anticlockwise for clarity, is shown in FIG. 21. The cross-hatched squares represent stave cells 2101 that correspond to pixels that are part of a line of a stave, i.e. they are cells corresponding to the identified line of a stave 1008 in FIG. 10B. The black squares represent black cells 2103 and correspond to part of note lower portion 1005 in FIG. 10B. The striped squares represent split end cells 2102 of note head portion 1005 that have been identified as a split end, and therefore these cells have the split end value.

In order to determine the specific musical character or part of a musical character that corresponds to the note 1001, it is necessary to repair the note head portion 1005. The term "repair" means reconstructing the shape of a missing portion of an object, wherein the missing portion is the portion that is superimposed with or overlaps a line of a stave or a stem of a note, by adding at least one black cell (cells having the first value) to the note portion at the superimposed or overlapping areas.

In the example of FIG. 10B, the object (the cells corresponding to note lower portion 1005) only has a top split end and therefore, at step s904, the top split end of the object is repaired to form a repaired object. The term "repaired object" means a group of directly adjacent cells having the first value, those cells being adjacent to cells having the stave value or the stem value, wherein cells having the stave value or the stem value are added to the group to be included as part of the repaired object. The group of cells to be included as part of the repaired object also includes the cells identified as a split end.

In the case of a split end that is not opposite another split end, for example the top split end of FIG. 10, the step of repairing the object to form a repaired object comprises applying a dome fill to the split end. By "split end not opposite another split end" it is meant that on the opposing side of the line of a stave or stem of a note directly adjacent to a first split end, there is no second split end when moving in a direction perpendicular to the line of a stave or stem of a note.

As shown in FIG. 10C, the top split end of the note lower portion 1005 has been repaired with the dome fill, thereby creating the repaired note 1007 (repaired object). The size of the dome is based on half of the corresponding stave line height. For example, the dome fill starts from the first side of the split end and, based on half of the corresponding stave line height (i.e. half the thickness of the stave line), a curved profile of cells having the first value is created ending at the second side of the split end and up to half the height of the stave. The dome fill therefore overwrites the values of those cells having the stave value with the first value to create a repaired object. Such a dome fill could equally be applied to a bottom, left or right split end in the same manner.

Figure 11:
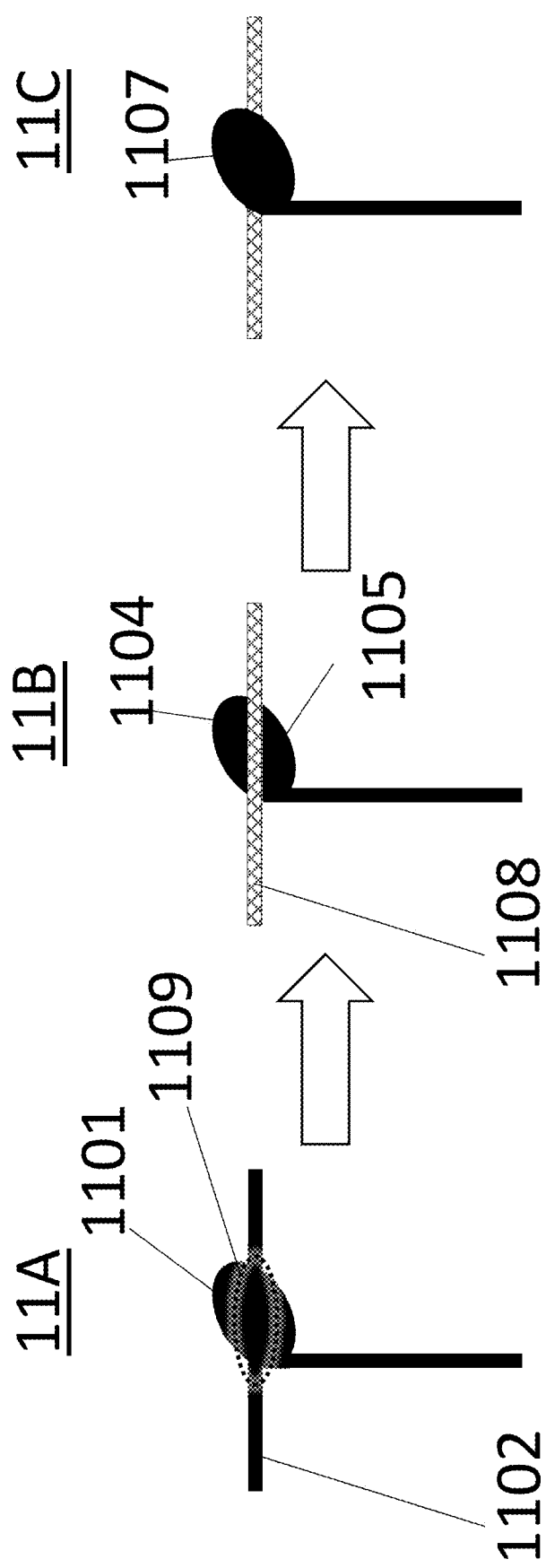
FIG. 11 illustrates an example of a line of a stave bisecting a musical character.

In some instances, an object may be bisected by a stave line or stem of a note and, therefore, the resulting split ends comprise both top and bottom split ends. FIG. 11 illustrates an example of a matrix wherein the cells correspond to a line of a stave bisecting a musical character (FIG. 11A). As in FIG. 10, FIG. 11 shows a zoomed-out matrix in which regions of like cells can be seen but individual cells of the matrix cannot be distinguished. Instead of a numerical value, each region of cells has a colour or pattern to represent a numerical value in order to more easily see the relationship between the matrix and the corresponding digital image. Regions of black cells of the matrix correspond to regions of pixels above the threshold intensity and regions of white cells correspond to regions of pixels below the threshold intensity. FIG. 11A illustrates a matrix corresponding to a line of stave 1102 and a note 1101. FIG. 11B illustrates a matrix corresponding to an identified line of a stave 1108 (cross-hatched), a note top portion 1104 and a note bottom portion 1105. FIG. 11C illustrates a matrix corresponding to a repaired note 1107. It can be seen that some regions of cells correspond to regions of pixels that are both part of the line of a stave 1102 and part of the note 1101, such as some of the cells highlighted by the circle 1109. In the example of FIG. 11, the bottom split end of the note top portion 1104 and the top split end of note bottom portion 1105 may be identified using the methods previously described. The top split end and bottom split end, which are opposite each other but slightly offset in this example, may both be repaired by providing a diagonal fill (as will be explained later) in the shape of a trapezium between the split ends, the diagonal fill replacing the value of the cells between the split ends and having the stave value with the first value. The result is the repaired note 1107. In other examples, the top and bottom split ends may not be offset, and therefore the fill may be a square or rectangular fill between the split ends (as will be explained later).

Figure 12:
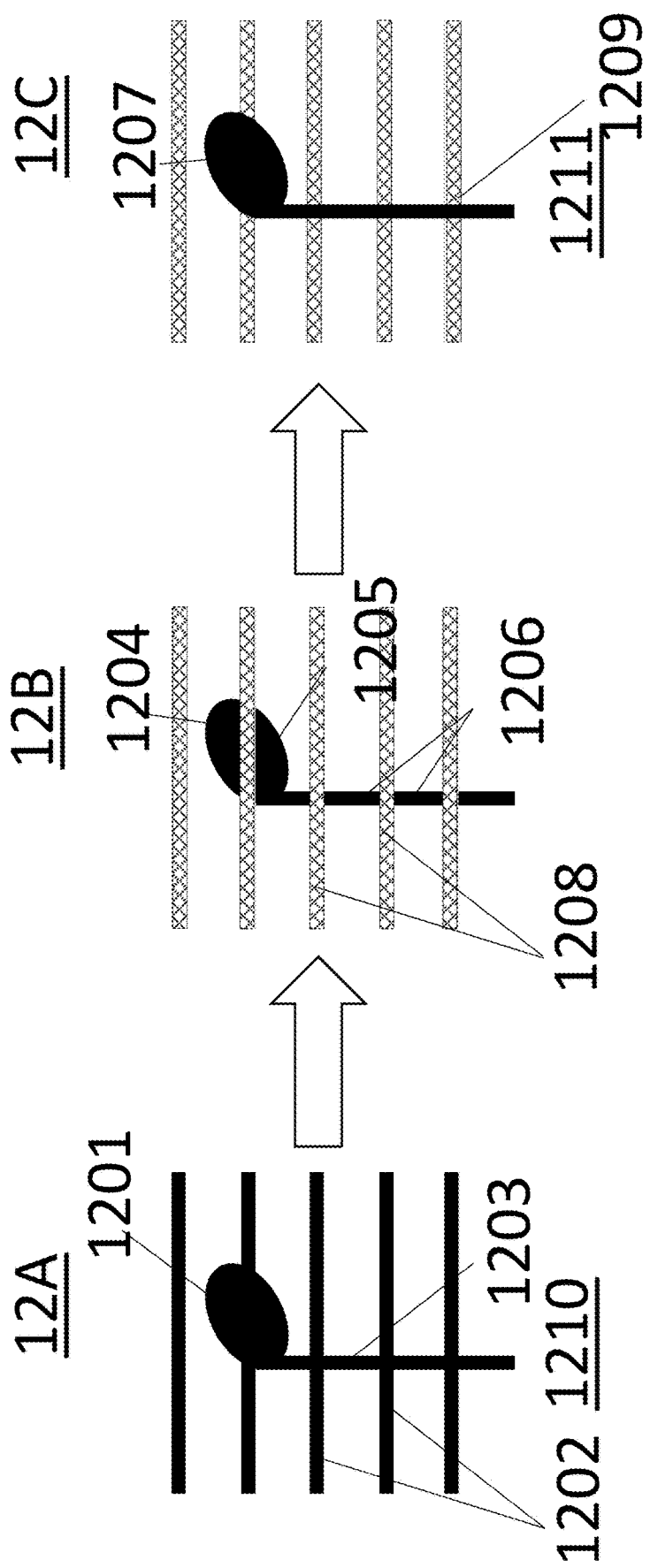
FIG. 12 illustrates an example of a note comprising a stem overlaying multiple lines of a stave.
Figure 13:
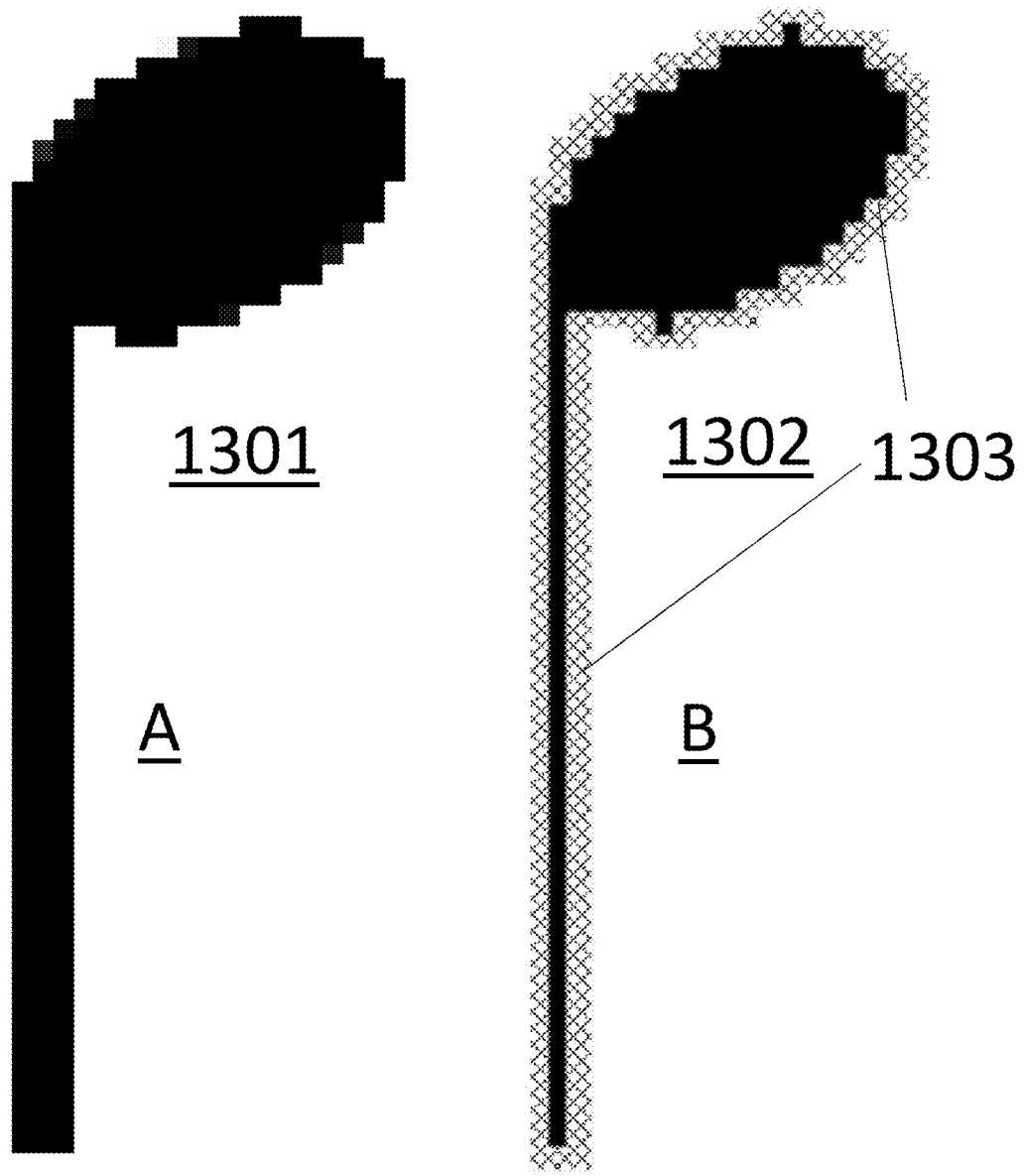
FIG. 13 illustrates an example of object contour cells of a traced object.

FIG. 12 illustrates an example of a matrix corresponding to a note 1210 comprising a note head 1201 and a stem 1203 overlaying multiple lines of a stave 1202 (FIG. 12A). Again, each of FIGS. 12A, 12B and 12C is a zoomed-out matrix wherein regions of like cells can be seen but individual cells of the matrix cannot be distinguished. The cells corresponding to identified multiple lines of a stave 1208 (which are cross-hatched) dissect the note head 1201 and the stem 1203, resulting in a note head top portion 1204, a note bottom portion 1205 and stem portions 1206, each with one or two split ends i.e. a top split end and/or a bottom split end (FIG. 12B). In this instance, all of these split ends may be repaired using the methods previously described to form a repaired note 1211 comprising a repaired note head 1207 and a repaired stem 1209 (FIG. 12C). The groups of pixels corresponding to note head top portion 1204, note bottom portion 1205 and stem portions 1206 are examples of objects. Two split ends of separate stem portions, which are directly opposite each other, may be repaired using a square fill.

If the split end is opposite another split end i.e. the split end is a bottom split end and the bottom split end is directly opposite a top split end or vice versa, then the split end may be repaired using a square fill that fills the space between the split ends with a square. If the split end is opposite another split end but not directly opposite, i.e. offset, then the split end may be repaired using a diagonal fill that fills the space between the split ends with a trapezium.

A detailed explanation of how to repair a split end will now be given with reference to FIG. 15.

Figure 15:
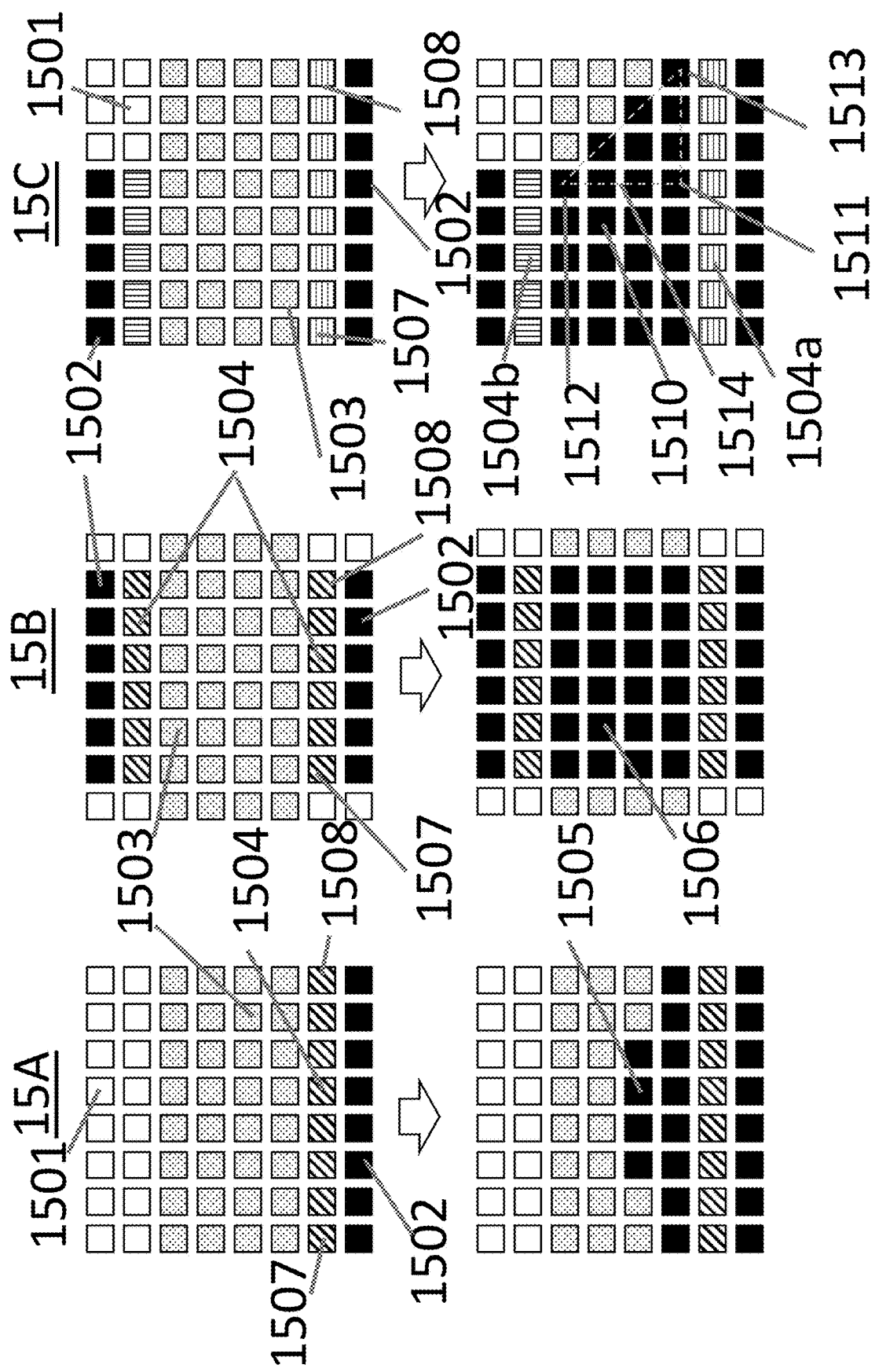
FIG. 15 illustrates examples of objects with split ends, before and after being repaired.

FIGS. 15A, 15B and 15C illustrate matrices before (top matrices) and after (bottom matrices) a split end of an object is repaired. The black squares in FIG. 15 represent black cells corresponding to pixels with a pixel intensity above the threshold value (i.e. they have the first value). The black cells are part of an object 1502. The white squares represent to white cells 1501 corresponding to pixels with a pixel intensity not above the threshold value (i.e. they don't have the first value). The dotted squares represent stave or stem cells corresponding to pixels that have been identified as part of a line of stave or stem of a note 1503. The diagonally striped squares represent split end cells that correspond to a split end 1504 of the object 1502 comprising the black cells.

FIG. 15A illustrates split end cells that are part of a split end 1504 that is not opposite another split end. Accordingly, the split end 1504 of FIG. 15A is repaired with a dome fill 1505.

FIG. 15B illustrates two rows of split end cells that are part of split ends 1504 that are directly opposite one another. Accordingly, the split ends 1504 are repaired with a square fill 1506.

With reference to FIG. 15C, the vertically striped squares represent split end cells of a first split end 1504a. The horizontally striped squares represent split end cells of a second split end 1504b that is partially offset relative to the first split end 1504a. Accordingly, FIG. 15C illustrates a matrix wherein some cells of the first split end 1504a are opposite cells of a split end and other cells of the first split end 1504a are not opposite another split end. Therefore, the second split end is repaired with a diagonal fill.

When repairing a split end, a split end and its type, i.e. top split end, bottom split end, left split end or right split end, is determined. Each split end is then individually processed as below:

A first extremity of a split end 1507 and a second extremity of a split end 1508 are shown in FIGS. 15A, 15B and 15C. It is determined whether directly opposite the first extremity 1507 or the second extremity 1508 there is a split end cell. That is to say, it is determined whether, passing through the vertically adjacent stave cells or the horizontally adjacent stem cells 1503 (i.e. in the direction perpendicular to the line of a stave or stem of a note), there is a split end cell 1504 at the opposite side of the line of a stave or stem of a note 1503.

FIG. 15A illustrates a matrix corresponding to a line of a stave or stem of a note 1503 directly adjacent to a split end 1507 on one side and pixels with a pixel intensity not above the threshold value 1501 on the other side. Accordingly, neither extremity of the split end 1504 is opposite another split end, and so a dome fill 1505 is applied, as illustrated.

A dome fill will now be described. Based on the split end type (top, bottom, left or right) and taking half of the corresponding stave line height or stem width, cells are given the first value (i.e. set to black cells) by iterating from the start to the end of the split end in an increasing or decreasing fashion to achieve a dome like shape. Orientation of the dome is based on the split end type. Accordingly, the dome fill overwrites the values of those cells having the stave value or stem value with the first value to create a repaired object.

If both a first extremity 1507 and second extremity 1508 of a split end 1504 are opposite another split end 1504, as is the case in FIG. 15B, a square fill 1506 is applied, as illustrated. The orientation of the square fill is based on the split end type: the square fill 1506 will be below a bottom split end but above a top split end.

A square fill will now be described. Iterating from the start to the end of the split end and based on the stave line height, all the stave or stem cells between the opposing split ends are set to the first value. Accordingly, the square fill overwrites the values of those cells having the stave value or stem value with the first value to create a repaired object.

When one extremity is opposite another split end and the other extremity is not, e.g. the first extremity 1507 of the first split end 1504a is opposite the second split end 1504b but the second extremity 1508 of the first split end 1504a is not opposite the second split end 1504b, as shown in FIG. 15C, a diagonal fill 1510 is applied, as illustrated.

A diagonal fill will now be described with reference to FIG. 15C. Where a portion of a first split end 1504a is directly opposite a second split end 1504b, such as in the region directly below the second split end 1504b but above first split end 1504a of FIG. 15C, a fill identical to a square fill is applied i.e. all the cells in this region are set to the first value. A triangle 1514 is formed between three stave/stem cells. These stave/stem cells are: the stave/stem cell 1512 directly adjacent to the extremity of the second split end 1504b directly opposite the first split end 1504a, the stave/stem cell 1511 directly adjacent to the split end cell directly opposite the extremity of the second split end 1504b and the stave/stem cell 1513 directly adjacent to the split end cell of the extremity of the first split end 1504a that is not directly opposite the second split end 1504b. The stave cells or stem cells falling within this triangle and corresponding to an edge of this triangle are set to the first value. Accordingly, the diagonal fill overwrites the values of those cells having the stave value or stem value with the first value to create a repaired object. The shape of the repaired portion of the repaired object in this instance is, therefore, of a trapezium.

Once a split end has been repaired, the split end cells are set to the first value i.e. set to black cells.

Optionally, a dimension of the object may be determined, for example by determining a bounding box of the object and determining a dimension of the bounding box. The dimension may be compared with an object dimension threshold, wherein only if the dimension is above the object threshold dimension is the object repaired.

At step s905 the repaired object is compared with a representation of at least a part of a musical character.

An example of a representation of a musical character is an image of a musical character, a portion of an image of a musical character, an outline or contours of a musical character or any other representation that is characteristic of the musical character or defines at least a portion of the musical character. The representation of a musical character may capture information about holes, i.e. an absence of black pixels, inside the musical character.

Figure 22:
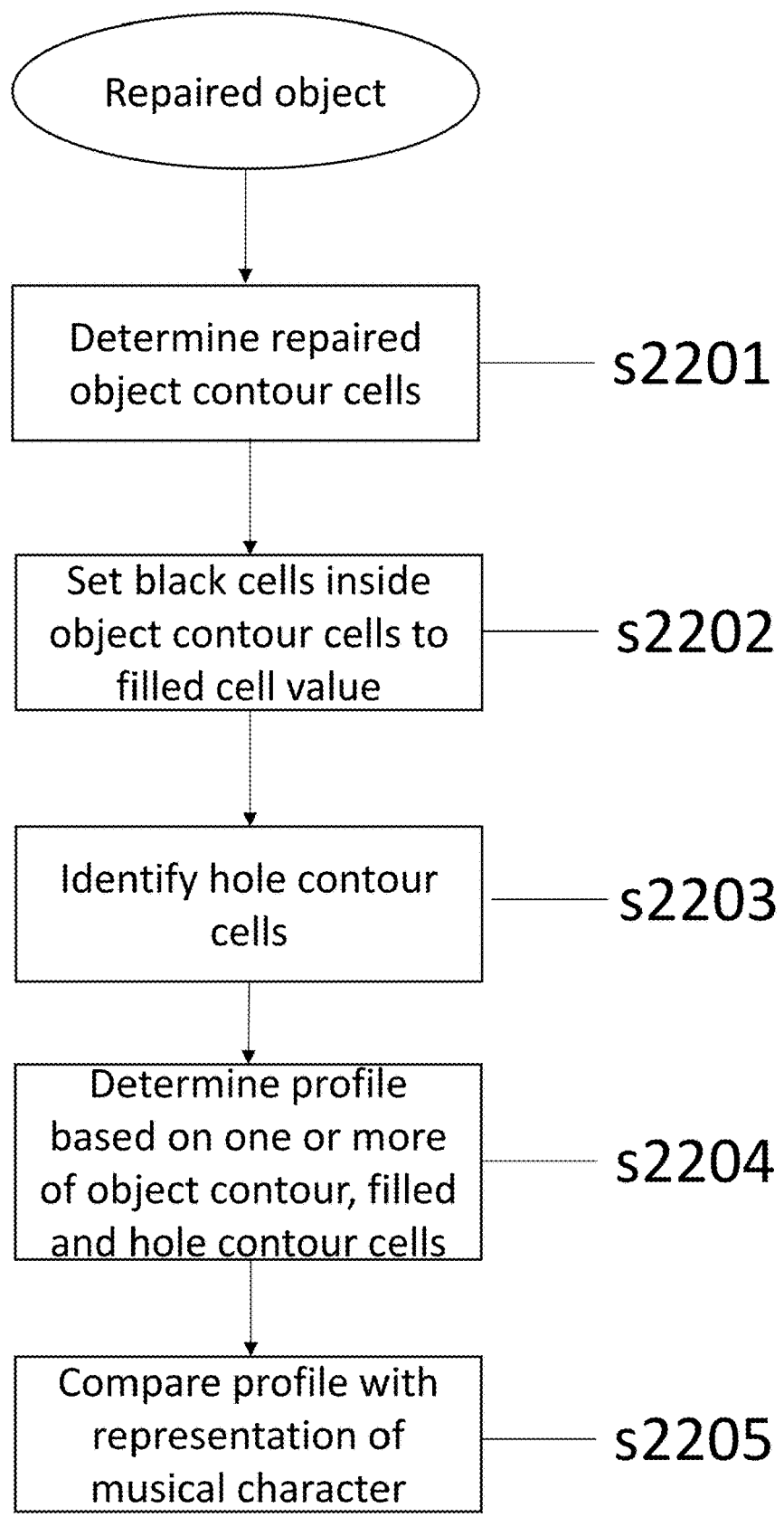
FIG. 22 illustrates a flow diagram for method of creating a profile of a repaired object.

Comparing the repaired object with a representation of at least a part of a musical character may be done using traditional template matching methods known to the skilled person. Alternatively, this may be done visually by a human. An example method of how this is achieved by first creating a profile of the repaired object, which is compared with a representation of a musical character, will now be given with reference to an example flow diagram illustrated in FIG. 22.

A profile of the repaired object is any characteristic or set of characteristics that is representative of the shape of the repaired object. For example, the profile may be the cells corresponding to contours of the repaired object; cells corresponding to all pixels of the repaired object or cells corresponding to all pixels within the contours of the repaired object. The profile may capture information about holes, i.e. the absence of black pixels, inside the repaired object.

In this example, the contours of the repaired object are determined at step s2201. This may be referred to as tracing. A pre-defined route theory may be applied to crawl through the repaired object to identify the contours of the repaired object. As an example, the cells of the matrix derived from a digital image of a musical score take one of five values referred to as white (cells corresponding to pixels with a pixel intensity below the threshold value), black (cells corresponding to pixels with a pixel intensity above the threshold value), stave or stem (cells corresponding to a line of a stave or stem of a note) and object contour (cells that form the contour of the object). An example of code for the crawl path is given below:

int[,]ScanPathController=new int[,]{{−1,0},{0,1},{1,0},{1,0},{0,−1},{0,−1},{−1,0},{−1,0},{0,1}};

Beginning in central start cell 701, as illustrated in FIG. 7, in the same manner as previously described, the value of each cell around start cell 701 is read in turn. In this instance, a clockwise path is described moving from cell 1/9 to 2 to 3 etc. before ending in 1/9; however, any path may be used. Using this route theory, if the start cell is a black cell and if any of the cells surrounding the start cell do not have the first value, then the start cell must be an object contour cell. Cells identified as object contour cells are updated with an object contour value, otherwise they are left with their original value. Cells that have been parsed may have their value updated to avoided being reparsed.

FIG. 13B illustrates a matrix for a traced object 1302 comprising a region of object contour cells 1303 (represented by a cross-hatched region) surrounding a region of black cells (represented by the black region). The matrix for the corresponding untraced object 1301 is shown in FIG. 13A. Each of FIGS. 13A and 13B is a zoomed-out matrix wherein regions of like cells can be seen but individual cells of the matrix cannot be distinguished.

At step s2202, black cells inside the object contour cells are given a filled cell value and are referred to as filled cells.

At step s2203, contours inside the repaired object (hole contours) are identified. First, white pixels inside the repaired object ("holes") are identified. The white cells within the object contour cells are parsed to identify the hole contour cells, which are those white cells directly adjacent to the filled cells and those white cells (if any) directly adjacent to the object contour cells. This is achieved by analysing the cell values—white, contour and filled—and using the pre-defined path described below:

Once a white cell is reached, the surrounding cells are crawled using a pre-defined path such as the path described below.

int[,]ScanPathController=new int[,]{{-1,0},{0,1},{1,
0},{1,0},{0,-1},{0,-1},{-1,0},{-1,0},{0,1}};

Beginning in central start cell 701, as illustrated in FIG. 7, the value of each cell around start cell 701 is read in turn. In this instance, a clockwise path is described moving from cell 1/9 to 2 to 3 etc. before ending in 1/9; however, any path may be used. Using this route theory, if the start cell is a white cell and if any of the cells surrounding the start cell have a filled cell value or an object contour value, then the start cell must be a hole contour cell. Cells identified as hole contour cells are updated with a hole contour value, otherwise they are left with their original value. Cells that have been parsed may have their value updated to avoided being reparsed.

Figure 23:
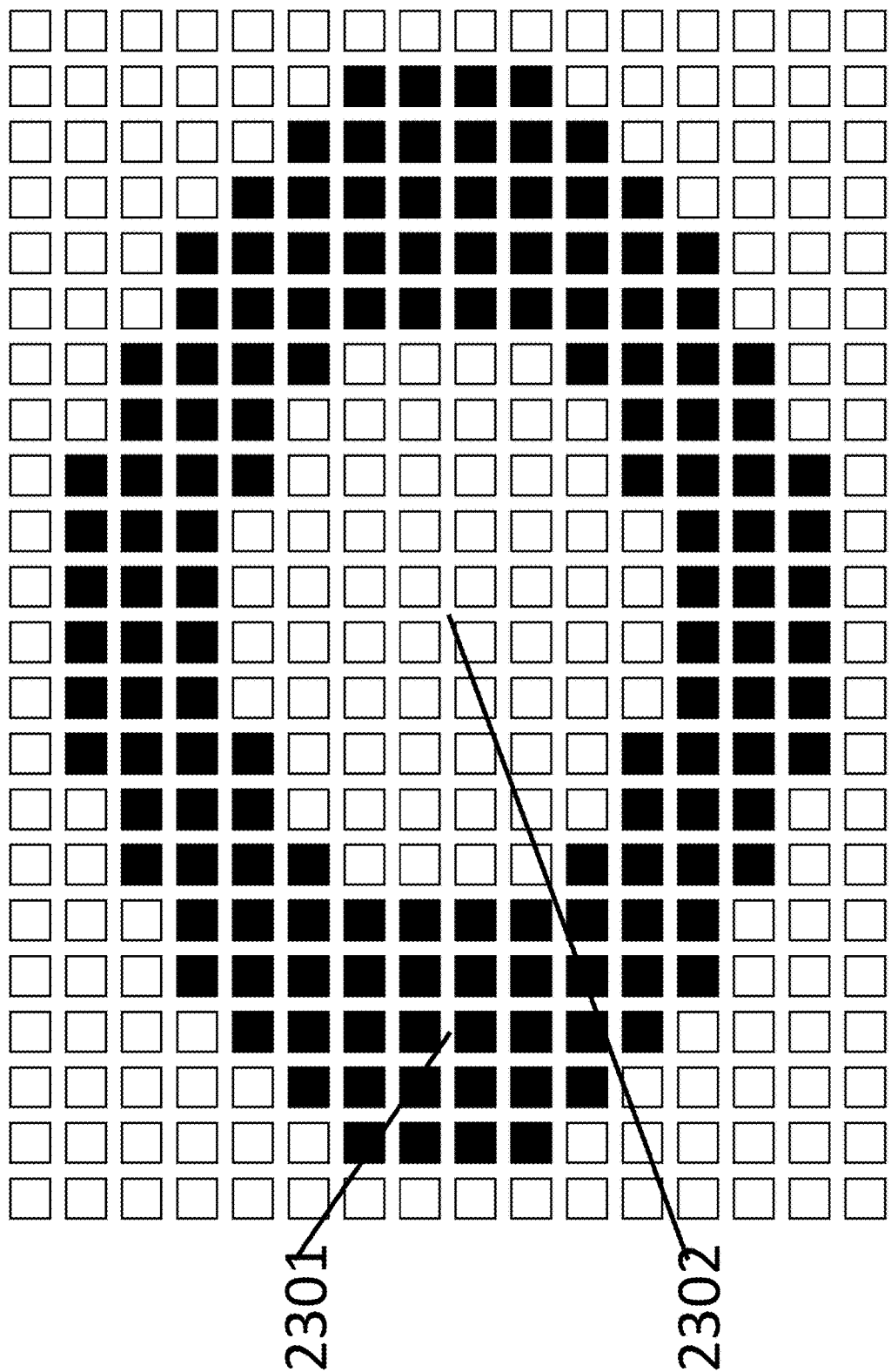
FIG. 23 illustrates a note with a hole.
Figure 24:
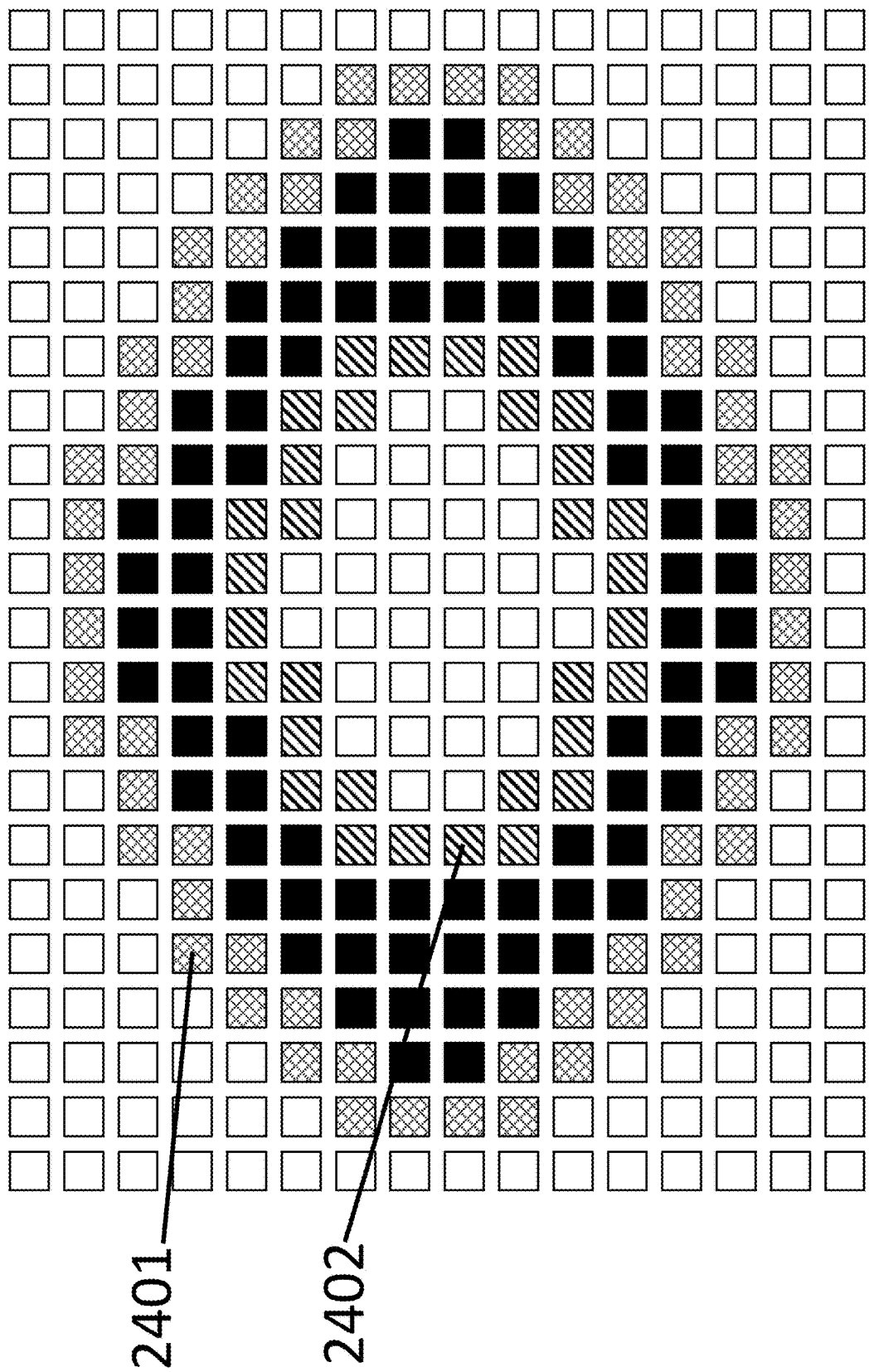
FIG. 24 illustrates the note of FIG. 23 wherein object contour cells and hole contour cells have been identified.

FIG. 23 illustrates a matrix corresponding to a note 2301, which is a repaired object, with a hole 2302. FIG. 24 illustrates a matrix corresponding to the same note but the object contour cells 2401 (represented by cross-hatched squares) and hole contour cells 2402 (represented by striped squares) have been determined. In FIGS. 23 and 24 black squares represent matrix cells with the first value (black cells) corresponding to pixels with the threshold value and white squares correspond to white cells corresponding to pixels without the threshold value.

As an object can have more than one hole inside it, the above algorithm continues to scan the object until all holes are identified.

At step s2204, the row and column values of object contour cells, filled cells and hole contour cells are combined to determine the profile of the object. Alternatively, the profile may comprise the row and column values of a subset of the object contour cells, filled cells or hole contour cells, or indeed only one of them. For example, the profile may comprise the row and column values of the object contour cells only.

The above algorithm is applied to a single repaired object at a time.

At step s2205 the profile is compared with a representation of at least a part of musical character. The profile may be converted into a format suitable for comparison with the representation of a musical character in the same format. For example, the profile may be converted into binary representation (bitmap). The bitmap may be resized to fit to a fixed resolution (e.g. 100 by 100 pixels) in order to keep consistency of matching. The representation of a musical character may be in the same format for ease of comparison.

The comparison or matching may be performed on a machine learning server in the cloud. To increase the performance of sending data to the cloud, a bitmap may be encoded using a run-length encoding (RLE) algorithm. RLE is a form of lossless data compression in which runs of data (that is, sequences in which the same data value occurs in many consecutive data elements) are stored as a single data value and count, rather than as the original run.

This encoded data may then be sent to a request queue in the cloud. An array of machine learning servers picks this request up and matches the data against a representation of a musical character, quantifying the similarity between the encoded data and the representation using conventional support vector machine methods.

A library of representations of musical characters may be prepared by training a machine learning server using training data. The training data may be created using the methods of the first and third aspects disclosed herein. Individually identified profiles may be converted into textual data of 0s and 1s directly representing the matrix. If the profiles are converted from a fixed resolution (e.g. 100 by 100 pixels) bitmap, there will be 10100 (including carriage returns) individual characters for each representation. This may be stored as a string rather than binary data to make it easier to split and manipulate while training the machine learning server engines.

Musical notation, musical characters, letters, numbers or any other shapes that may appear on a musical score are predefined using the results of the training data. This may be achieved by visually identifying a musical character corresponding to an object and mapping the musical character onto the corresponding training data result. Newly identified shapes may be added to the library. Category of the object (for use when re-engraving a digital image of a musical score as described below), stages of matching, data for template matching, replacement fonts etc. are also linked to this dataset.

Returning to the process shown in FIG. 9, after the comparison of the repaired object with a representation of at least a part of a musical character has been completed, at step s906 the at least a part of musical character that corresponds to the repaired object is determined based on the outcome of the comparison.

This may comprise quantifying the similarity between the repaired object or repaired object profile (as determined above) and the representation of the musical character. For example, a probability value for the match or any other descriptor quantifying the similarity between the repaired object or repaired object profile and the representation of the musical character may be determined, as would be understood by the skilled person. For example, it may be determined that the repaired object corresponds to the musical character if the similarity is above a similarity threshold. The similarity threshold may be a probability value threshold, for example 64%.

Optionally, the repaired object or repaired object profile may be compared with more than one representation of at least a part of a musical character. For example, a machine learning server may compare the repaired object or repaired object profile with more than one representation of a musical character. For example, multiple representations of musical characters may be stored in a library of representations, against which the repaired object or repaired object profile is compared. The similarity between the repaired object or repaired object profile may be quantified for each representation in the library. It may be determined that the repaired object corresponds to the musical character that has the highest similarity to the repaired object. Such a method improves the accuracy of the comparison step.

The machine learning server engines may have a distributed architecture with service buses and scalable server instances, where the core of the engine is a multiclass support vector machine with a polynomial kernel with liner strategy. The training data and the corresponding profiles may be fed through these engines every time a new profile is built. From the training data and library of representations, the 10,000 individual features for each and every mapped representation are generated. Support vectors are then created and the learning is cached. A matching request is then picked up by the engine and the decisions are made using a voting method. Based on the probability of such decisions, top results are compiled and sent back to the queue to be picked up by the musical character matching process.

Optionally, in order to avoid matching errors, the matched data may be passed through traditional template matching. The templates may be chosen based on the matched classification. Classifications and templates may be configured in a training platform such as the training platform described above. Optionally, only if the template matching also gives a probability for a match above a template match probability threshold, it may be determined that the object corresponds to the corresponding musical character.

Optionally, orphaned black pixels or orphaned groups of black pixels may be removed prior to determining a profile of the repaired object. Orphaned black pixels or orphaned groups of black pixels are pixels that do not contact a line of a stave and that are below a threshold size, for example 175 pixels. They may be removed, e.g. set to a colour that is a colour of the background of the digital image (typically white or close to white) with an intensity below the threshold intensity, prior to determining a profile of the repaired object so that a profile of the orphaned black pixels or orphaned group of black pixels is not generated.

Figure 16:
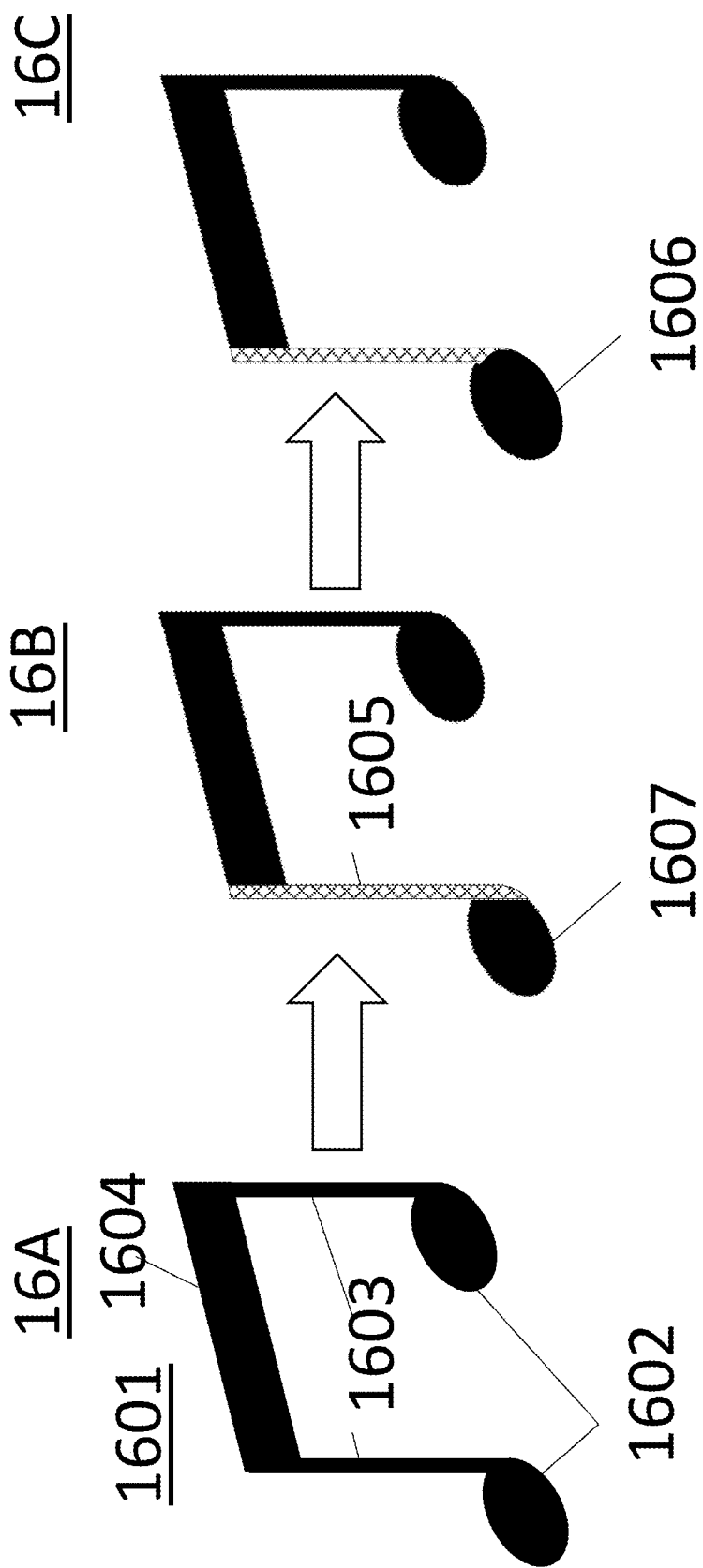
FIG. 16 illustrates a double note comprising two quavers connected by a beam and two stems.

As stated above, musical characters may be composed of parts of musical characters. For example, notes (e.g. crotchets, quavers etc.) may be connected to one another via beams, which are parts of musical characters. Notes themselves comprise stems and note heads, where note heads are a part of a musical character. FIG. 16 illustrates a matrix, regions of which correspond to a double note 1601 comprising two quavers 1602 each having a note head portion 1607 and a stem 1603, the stems 1603 connected together by a beam 1604. Stave lines are not shown for clarity. FIGS. 16A, 16B and 16C each show a zoomed-out matrix wherein regions of like cells can be seen but individual cells of the matrix cannot be distinguished. The method of the third aspect may be used to identify at least a part of musical character, which may be an entire musical character.

Identification of a region of stem cells 1605 (corresponding to the cross-hatched region) may be achieved in accordance with a method of the first aspect disclosed herein. Alternatively, the identification may also be done by any other method known to the skilled person or visually by a human.

The region of adjacent cells corresponding to a note head portion 1607 (represented by the black region) of FIG. 16B is an example of an object and has a split end directly adjacent to the region of identified stem cells 1605. Specifically, the split end is a left split end. Accordingly, as shown in FIG. 16C, the split end may be repaired to form repaired note head 1606. In this example, the split end has been repaired with a dome fill, as described above.

Disconnecting notes connected by stems and other musical characters such as beams separates connected notes into their individual note heads, as described above with reference to FIG. 16. This may improve the accuracy of comparing the repaired object with a representation of a musical character (s905) and/or determining that the repaired object corresponds to a musical character based on the comparison of the repaired object with the representation of the musical character (s906).

Fourth Aspect

A fourth aspect disclosed herein is a method of removing debris from a digital image of a musical score, wherein the debris is directly adjacent to a line of a stave or stem of a note. A flow diagram of a method of identifying debris pixels a digital image of a musical score is illustrated in FIG. 14.

The term "debris" means a pixel in a digital image of a musical score that does not correspond to a musical character, a line of a stave or a stem of a note. Particularly, debris may mean one or more pixels directly adjacent to a line of a stave or stem of a note, wherein the pixels don't correspond to at least part of musical character. Debris may also refer to a plurality of pixels that are directly adjacent to a line of a stave or a stem of a note, but not identified as part of the line of a stave or the stem of a note, using the method of the first or second aspect described above. In other words, debris comprises any element of the digital image adjacent to a line of a stave or stem of a note that is there unintentionally. Such debris, an example of which can be seen on the line of a stave 101 in FIG. 1, makes the edges of the line of a stave or stem of a note appear rough or uneven, rather than smooth. Debris may result from scan issues, deterioration, bleed marks and other unintended artefacts resulting from creation of a digital image of a musical score from an original musical score. Debris may also result from marks on an original musical score such as thumb prints, stains, smudges and other unintended marks that are incorporated into the digital image when the image is created from a musical score. Dots 105, 107 in FIG. 1 are examples of debris and orphaned pixels/groups of pixels that are not adjacent to a line of a stave or stem of a note.

Figure 14:
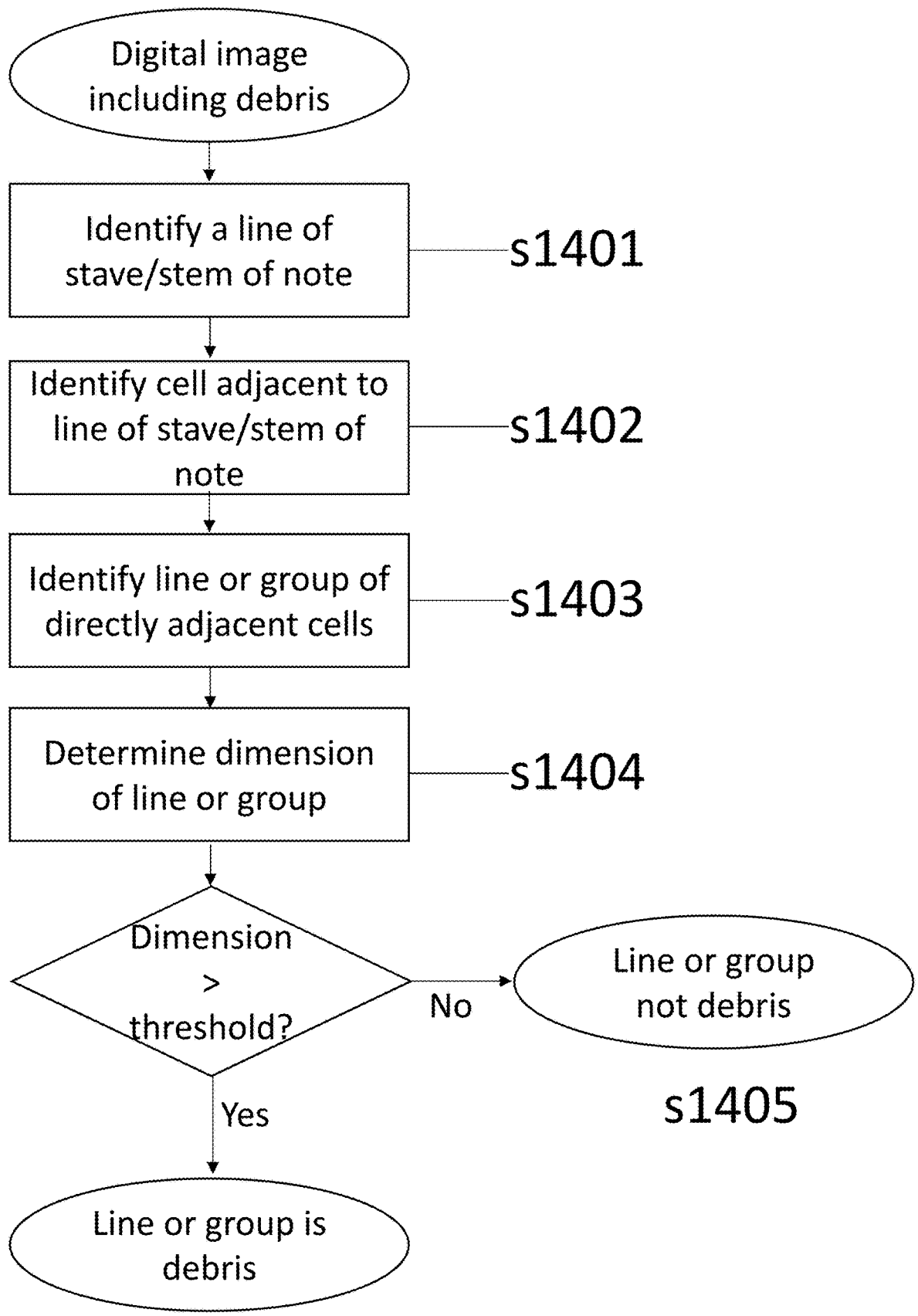
FIG. 14 illustrates a flow diagram of a method of removing debris from a digital image of a musical score.
Figure 17:
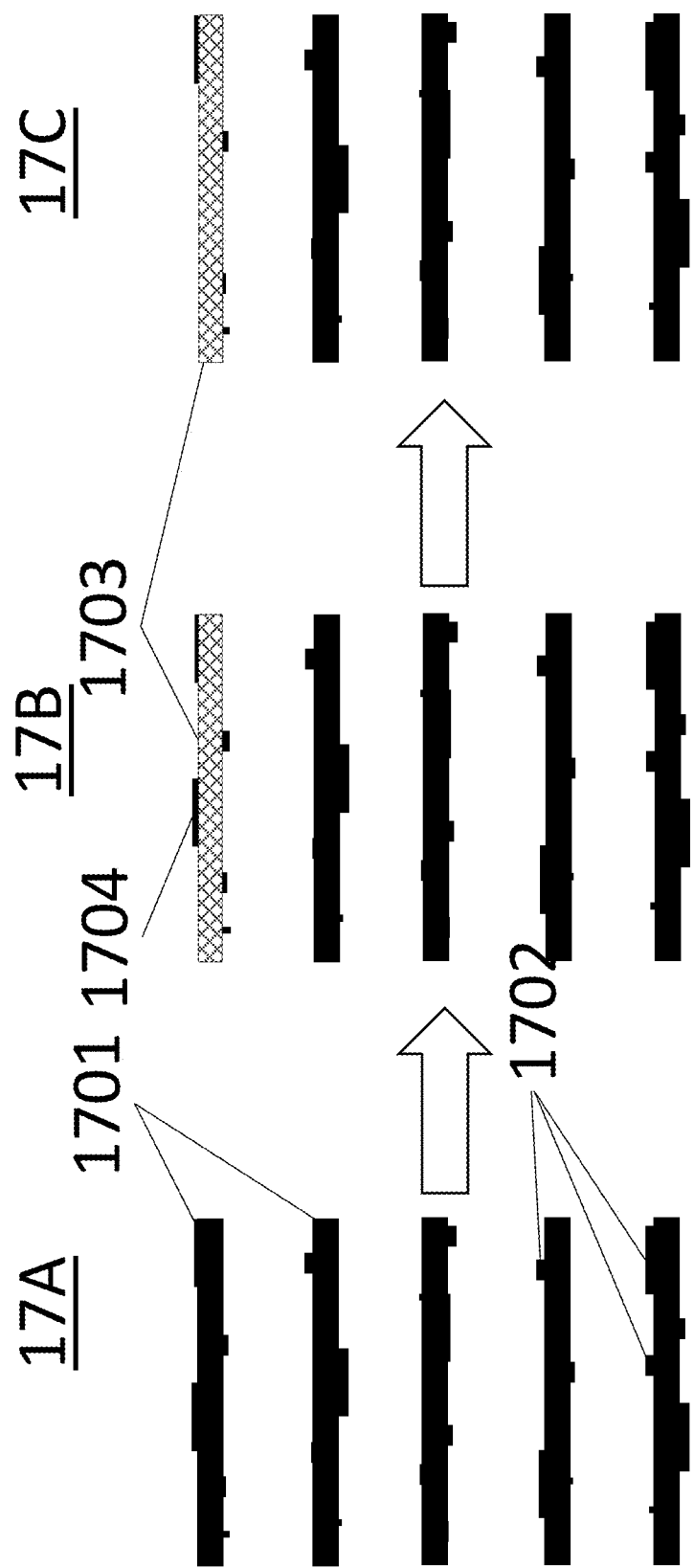
FIG. 17 illustrates lines of a stave surrounded by debris.

A method of removing debris from a digital image of a musical score will now be provided with reference to FIGS. 14 and 17. FIGS. 17A, 17B and 17C each show a zoomed-out matrix wherein regions of like cells can be seen but individual cells of the matrix cannot be distinguished. Black regions represent regions of black cells and white regions represent regions of white cells. FIG. 17A illustrates regions of cells corresponding to lines of a stave 1701. The lines of a stave 1701 are deteriorated, for example because of scan issues when preparing the digital image of a musical score. As a result, the lines of a stave 1701 have debris 1702 at their edges.

At step s1401, cells corresponding to pixels of a line of a stave or a stem of a note in the digital image are identified. This may be done in accordance with the first or second aspect previously described or any other method. Such pixels may be referred to as line pixels. A region of stave cells corresponding to an identified line of a stave 1703 (crosshatched region) is shown in FIG. 17B.

At step s1402, one or more cells adjacent to the cells corresponding to a line of a stave or stem of a note are identified. The identified cells correspond to pixels that have a colour that is different to that of the background of the digital image (the background typically being white). Therefore, the identified cells correspond to pixels that have an intensity value that is different to a value of pixels having the background colour of the image. The identified cells may therefore have the first value (i.e. black pixel), for example.

Additionally, the identified cells exclude cells that correspond to a line of a stave or a stem of a note. The cells therefore also have a value that is different to the stave cell value or the stem cell value. The identified cell is directly adjacent to those cells corresponding to a line of a stave or a stem of a note. As an example, the identified cells 1704 of FIG. 17B are directly adjacent to the identified line of a stave 1703.

An example of how one or more cells directly adjacent to the line of a stave or stem of a note may be identified will now be described. The cells 1704 directly adjacent to the line of stave may be identified by crawling through contours of the identified line of a stave 1703. First, contours of the line of a stave or stem of a note are identified, for example in accordance with the first aspect disclosed herein. Accordingly, cells within the contours will have the stave value. Next, a cell having the first value directly adjacent to the contour of the line of a stave or stem of a note is identified. This is achieved by analysing the cell values—for example, contour, stave and neither-contour-nor-stave—and using the pre-defined path described below:

Once a contour cell is reached, the surrounding cells are crawled using a pre-defined path such as the path described below.

```
int[,]ScanPathController=new int[,]{{-1,0},{0,1},{1,
    0},{1,0},{0,-1},{0,-1},{-1,0},{-1,0},{0,1}};
```

Beginning in central start cell 701, as illustrated in FIG. 7, the value of each cell around start cell 701 is read in turn. In this instance, a clockwise path is described moving from cell 1/9 to 2 to 3 etc. before ending in 1/9; however, any path may be used. Using this route theory, if any of the cells surrounding the start cell (a contour cell) have the first value, then the cell with the first value is given the debris value, indicating that the cell may correspond to a pixel that is debris. Otherwise, all cells are left with their original value. Cells that have been parsed may have their value updated to their corresponding parsed value to avoided being reparsed.

The identified cell with the debris value, which is directly adjacent to the line of a stave or stem of a note, may be part of a group of cells.

The group of cells may be a straight line of directly adjacent cells extending away from the line of a stave or stem of a note (i.e. vertically or horizontally, respectively). If the length of such a line of cells is large, this would suggest that the line of cells correspond to pixels that are part of a musical character, as described above with reference to the third aspect disclosed herein. On the other hand, if the length of such a line is small, this would suggest that the line corresponds to pixels that are debris and it is desirable to remove the entire line of pixels from the digital image.

Therefore, at step s1403, the length of a line of directly adjacent pixels extending away from the line of a stave or stem of a note is determined.

The length of a straight line of directly adjacent pixels extending away from the line of a stave or stem of a note may be determined by determining whether there is a cell with the first value directly adjacent to the identified cell with the debris value in the direction extending away from the line of a stave or stem of a note. For example, if the identified cell is above a line of a stave, it is determined whether the cell directly above the cell with the debris value has the first value. If so, the cell is given the debris value and the process is repeated i.e. it is determined whether the next cell directly adjacent to the newly identified debris cell along a straight line also has the first value. This process is repeated until a cell without the first value is identified.

Alternatively, at step s1403, a group of directly adjacent cells (that may not be a straight line) comprising the identified cell with the debris value may be determined. The group of directly adjacent cells comprises all cells with the first value that connect to the identified cell with the debris value via a cell with the first value, including cells with the first value directly adjacent to the identified cell. Cells belonging to a group of directly adjacent cells may be determined using a crawling method disclosed herein, mutatis mutandis, as would be understood. Cells belonging to a group of directly adjacent cells may have their cell value updated to the debris value.

At step s1404, a dimension of the one or more cells or group of cells or line of cells with the debris value is determined. To determine the dimension, a total number, total area, maximum height or maximum width of the cells or group of cells or the length of the line of debris cells is determined. Optionally, a minimum bounding box of the cells is determined. The dimension may therefore be the total number, total area, maximum height, maximum width or a dimension of a minimum bounding box.

At step s1405, the dimension of step s1404 is compared with a debris threshold dimension. The debris threshold dimension sets a dimension upper limit, below which the identified cells having that dimension (total area, total number, total height, total width or minimum bounding box dimension) are considered to correspond to debris pixels. The debris threshold dimension may, for example, be a total number of 175 cells or a total length of 3 cells.

Therefore, if the dimension is below the debris threshold dimension, the identified cells having that dimension are determined to correspond to debris and these cells are set to a value such that when the matrix is converted to a digital image, the corresponding debris pixels have a colour or intensity that is a colour or intensity of the background of the digital image. For example, the cells may be given the white cell value. If the dimension is above the dimension threshold, the cell value of the identified cells may be set to the first value.

The matrix can be converted to a new digital image by first creating a blank digital image with the same dimensions as the matrix. For example, if the matrix has 1000 by 1000 cells, the new digital image may have 1000 by 1000 pixels. Each pixel of the new digital image may correspond to a cell of the matrix. The intensity or colour of the pixels of the new image are then set to values corresponding to the cell values of the matrix. For example, pixels corresponding to white cells may be set to white which may be the background colour of the new image. Pixels corresponding to black cells may be set to black. Accordingly, cells identified as corresponding to debris may be set to white cells so that when the matrix is converted into a digital image, the corresponding pixels are the same colour as the background of the image.

Alternatively, in place of steps s1403, s1404 and s1405, the identified one or more cells with the debris value can be determined to correspond to debris pixels and set to a value such that, when the matrix is converted to a digital image, the one or more debris pixels have a colour that is a colour of a background of the digital image, as described above.

Fifth Aspect

A fifth aspect disclosed herein is a method of adjusting the angle of a digital image of a musical score to remove tilt.

The term "tilt" is defined as the average angle between lines of a stave in a digital image of a musical score and the bottom edge of the image of a musical score (which is a straight line).

When the digital image (digital image of a musical score or improved digital image of a musical score) is created by, for example, scanning an original musical score, the image may be titled if, for example, the original musical score is scanned at an angle. The resulting digital image is less aesthetically pleasing and harder to read than if the digital image were not titled. Accordingly, it is desirable to correct the angle of the digital image by removing the tilt (making the tilt equal to zero degrees).

Lines of a stave in the digital image of a musical score are identified, wherein each line may be identified in accordance with a method of the first or second aspect disclosed herein.

The angle of each identified line of a stave is calculated with respect to the bottom edge of the digital image of a musical score.

The commonality of the angles in calculated to determine a commonality angle, for example the median angle or mean angle.

The digital image of a musical score is rotated by the commonality angle, using conventional means, to remove tilt from the digital image.

Sixth Aspect

A sixth aspect disclosed herein is a method of re-engraving a digital image of a musical score.

Re-engraving a digital image of a musical score is the process of identifying elements in the digital image and then creating a new file or new digital image comprising new elements that correspond to the original elements in the original digital image. The shape of the new elements is similar to the shape of the elements in the original digital image, although not necessarily identical as the new elements may be better defined and less degraded than the original elements, or may have stylistic variations in the same way that letters in different fonts vary stylistically yet still convey the same meaning. At the end of the re-engraving process, a new image or a digital file encoding the nature and positions of the new elements is created. This file can be read in order to display an image corresponding to the original digital image.

Figure 25:
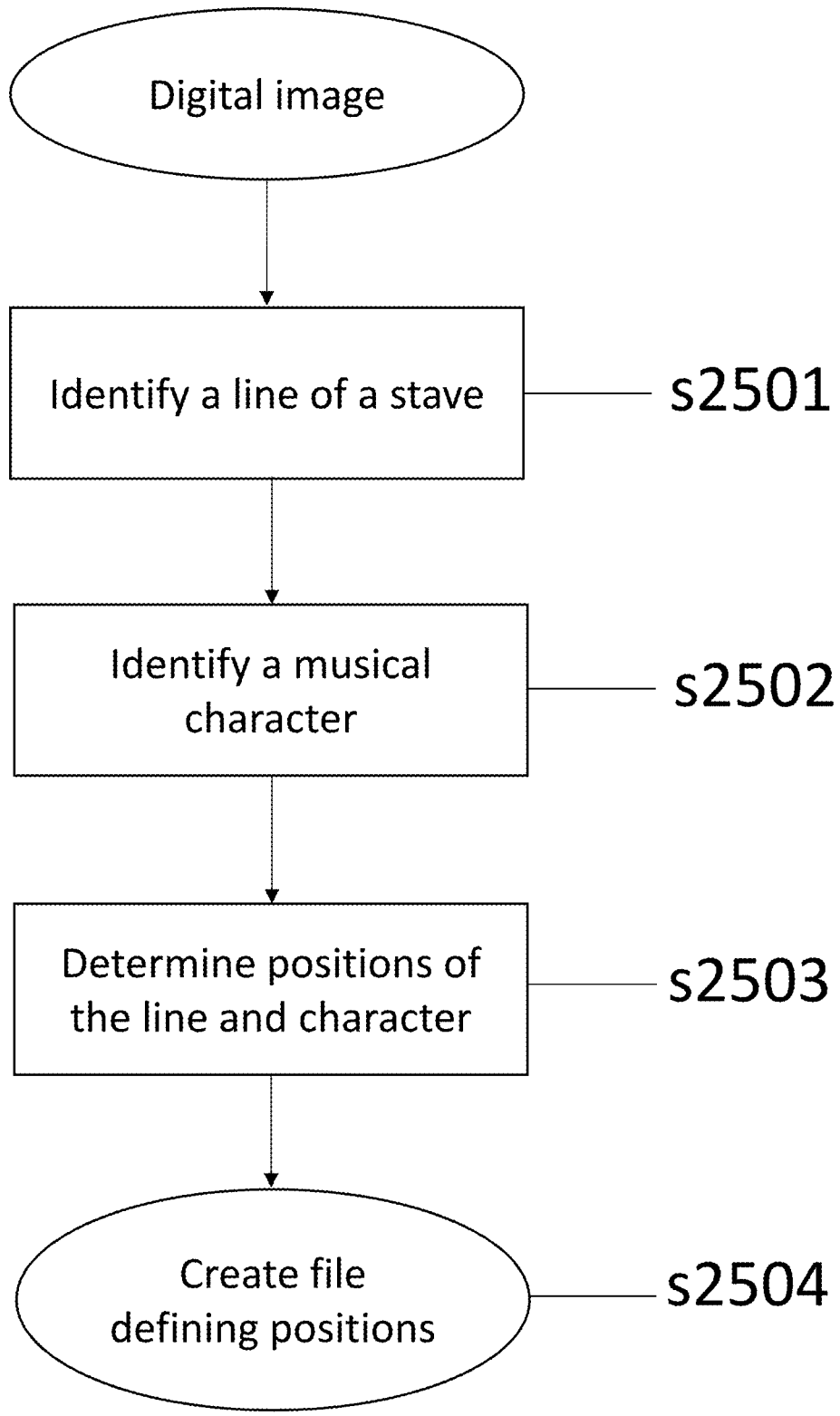
FIG. 25 illustrates a flow diagram for a method of re-engraving a digital image of a musical score.

A method of re-engraving a digital image of a musical score will now be described with reference to the flow diagram of FIG. 25.

At step s2501, a line of a stave in the digital image is identified in accordance with a method of the first aspect disclosed herein. For example, the steps of FIG. 3 may be used.

At step s2502, one or more musical characters in the digital image are identified in accordance with a method of the third aspect disclosed herein. For example, the steps of FIG. 9 may be used.

At step s2503, positions of the line of a stave and the musical character are determined including their dimension and orientation. These positions are readily determined as the matrix contains cells having the stave value, the stem value and repaired object value.

At step s2504, a digital file comprising data defining the positions of the line of a stave and the musical character is created. The positions may be the absolute positions or relative positions. In defining the positions of the line of a stave and the musical character, the file also comprises data encoding the shape of the line of a stave and musical character. The digital file may be an image file such as bitmap (.bmp), jpeg, graphics interchange format (.gif), tagged image file format (.tiff) or portable network graphics (.png) file; a file comprising vectorised image data such as a portable document format (.pdf) file; a proprietary format; or any other file type comprising data defining the positions of the line of a stave or the stem of a note and musical character. The skilled person would understand how the positions and shapes may be defined in the digital file, based on the preceding information.

Figure 2:
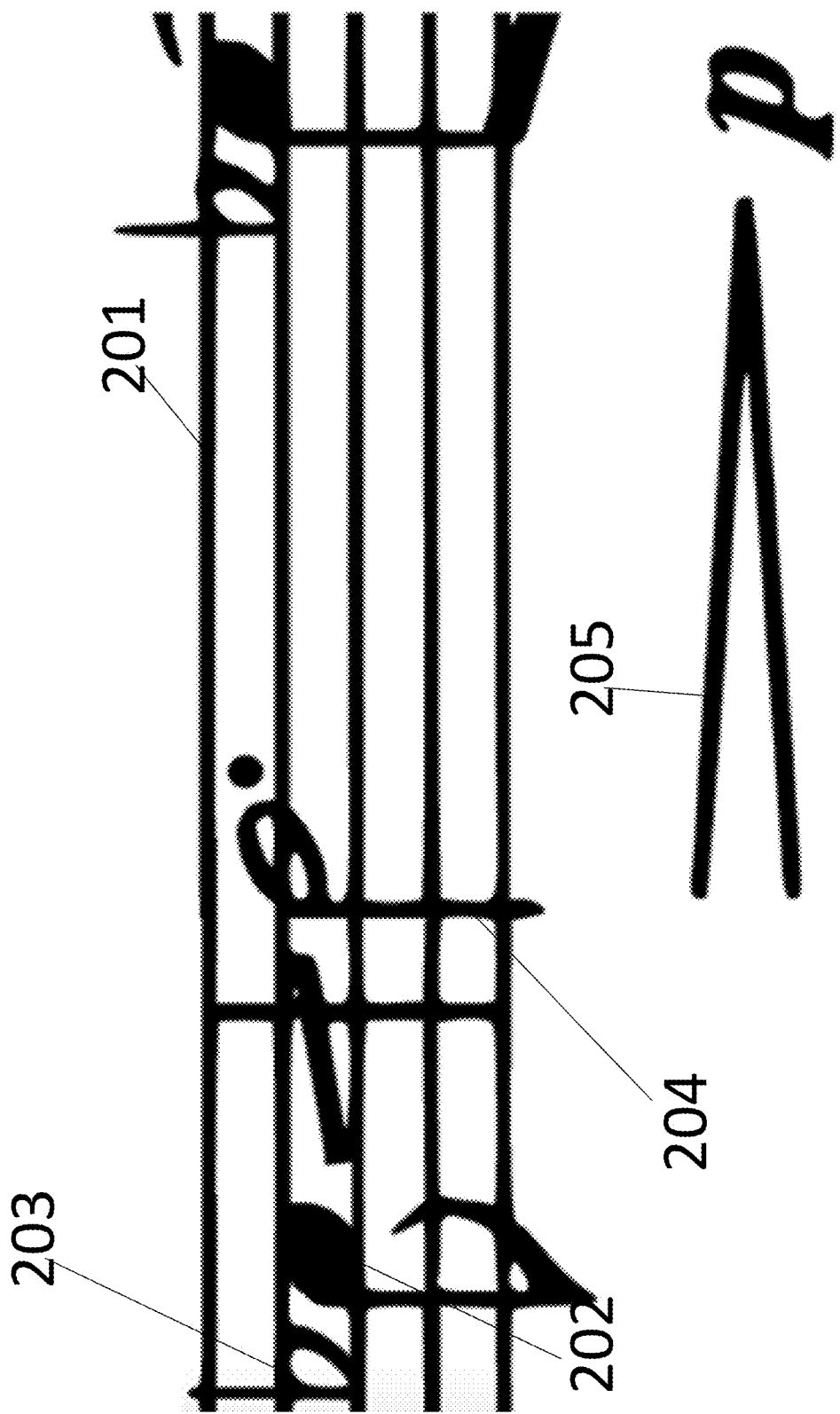
FIG. 2 illustrates and example of a re-engraved version of the musical score of FIG. 1.
Figure 18:
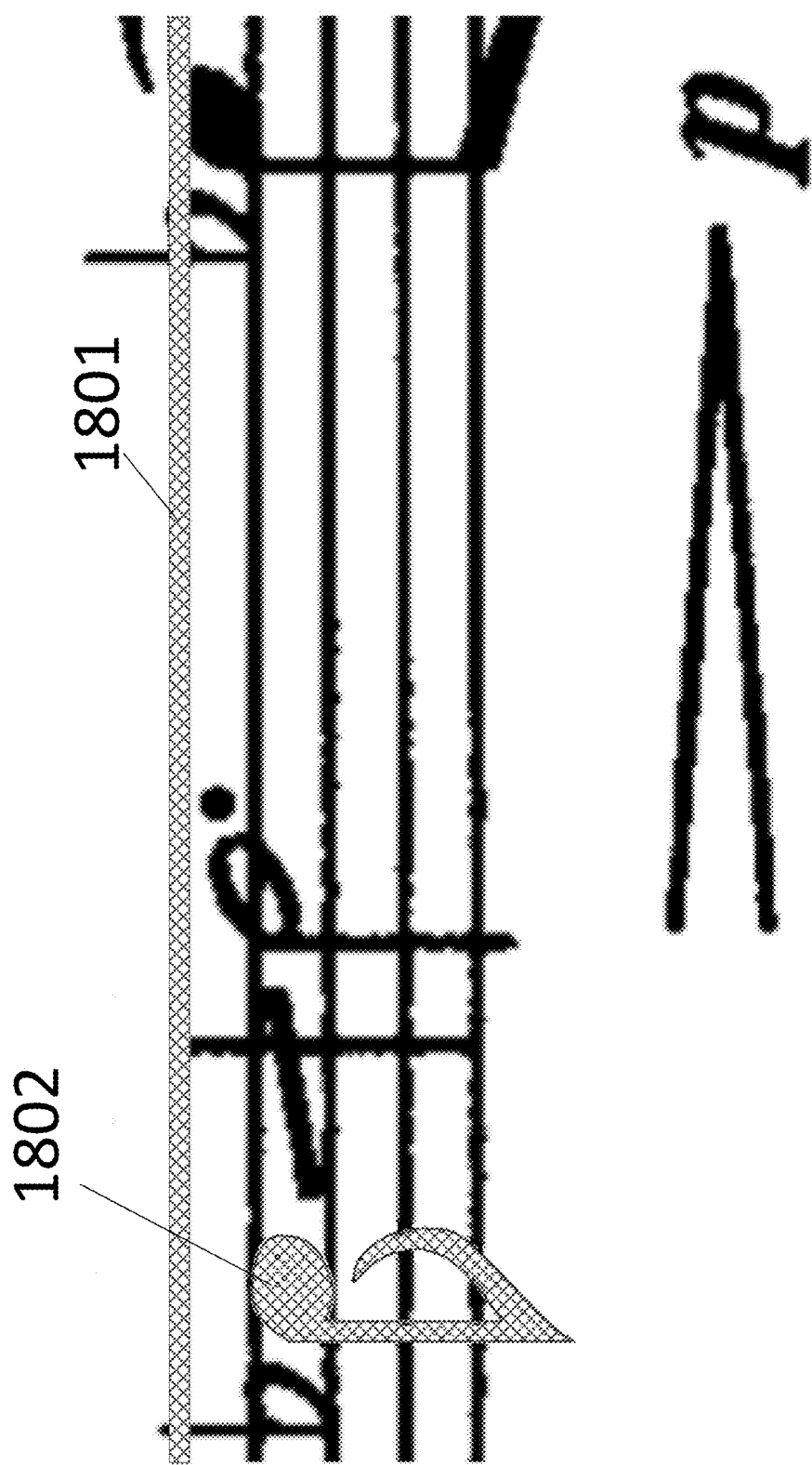
FIG. 18 illustrates the musical score of FIG. 1 wherein a line of stave and a note have been identified.

An example of a method of re-engraving a digital image of a musical score will now be given with reference to FIGS. 1, 2 and 18. FIG. 18 illustrates the musical score of FIG. 1 wherein the line of stave 101 has been identified as a line of a stave. An identified line of a stave 1801 (cross-hatched) is shown. This is achieved using the method of the first aspect disclosed herein. A note 103, which is an example musical character, has also been identified. Identified note 1802 (cross-hatched) is shown in FIG. 18. This is achieved using the method of the third aspect of the invention.

The coordinates of the line of a stave and musical character within the digital image are determined. The coordinates may be determined from the coordinates of the pixels or corresponding matrix cells of the line of the stave and the musical character.

A digital file is created comprising vectorised data defining the positions of the line of a stave or the stem of a note and musical character, as would be understood by the skilled person.

Figure 19:
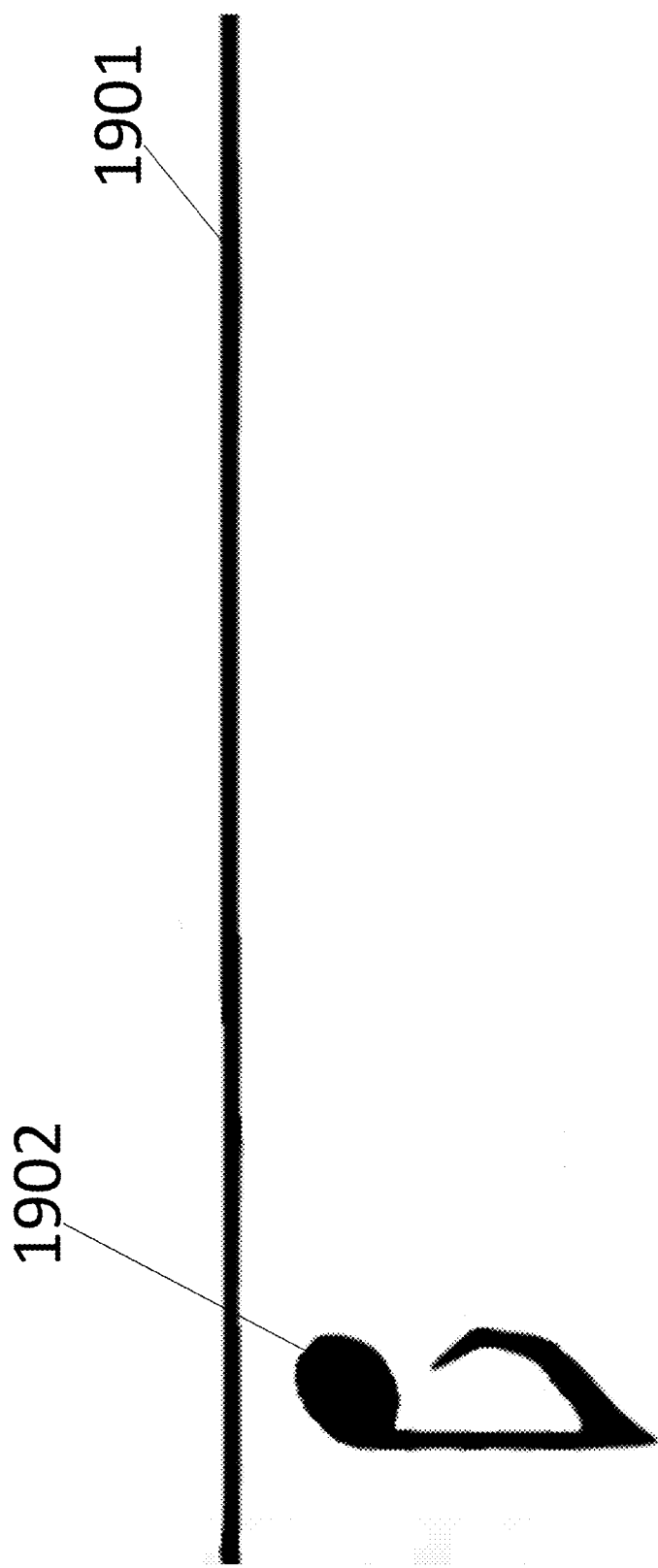
FIG. 19 illustrates an example of a re-engraved line of a stave and a re-engraved note.

When the digital file is viewed, an image such as that shown in FIG. 19 is seen. Such an image includes all identified objects, which in this case is the identified line of a stave 1801 and identified note 1802 in FIG. 18. FIG. 19 shows a re-engraved line of a stave 1901, that corresponds to a line of a stave 101 in FIG. 1 (identified line of a stave 1801 in FIG. 18), and a re-engraved note 1902, that corresponds to a note 103 in FIG. 1 (identified note 1802 in FIG. 18).

More than one line of a stave and/or musical character may be identified, have their positions determined and be added to the digital file using the previously described methods. For example, all of the lines of a stave and all musical characters in FIG. 1 may be identified, have their positions determined and a digital file comprising data defining the positions of the lines of a stave and musical characters may be created. When the resulting digital file is viewed, an example of a resulting image can be seen in FIG. 2, wherein all of the lines of a stave and musical characters in FIG. 1 have been re-engraved. FIG. 2 illustrates a re-engraved line of a stave 201, a re-engraved note head 202, a re-engraved flat symbol 203, a re-engraved stem 204 and a re-engraved decrescendo symbol 205.

Optionally, objects that are not identified as a line of a stave, stem of a note or musical character (including objects for which a similarity above a similarity threshold cannot be determined) may be copied and added to the digital file. Such objects may be checked manually to decide whether they should be added to the digital file. Such objects may be converted into a vectorised image format.

Optionally, the page orientation of a digital image of a musical score may be adjusted in accordance with the fifth aspect disclosed herein.

The invention claimed is:

1. A method of identifying a line of a stave or a stem of a note in a digital image of a musical score, the method comprising:
  converting the digital image into a matrix in which at least one cell of the matrix corresponds to a pixel of the digital image;
  setting the at least one cell of the matrix to a first value if the corresponding pixel of the digital image has a pixel intensity above a threshold intensity;
  identifying adjacent cells having the first value as linked cells, the adjacent cells corresponding to pixels being adjacent in one of a horizontal direction or a vertical direction of the digital image;
  identifying linked cells having a number of cells exceeding a threshold as a chain of cells; grouping adjacent chains of cells into a group of chains;
  determining a dimension of the group of chains; and
  comparing the dimension with a dimension threshold;
  wherein, if the dimension is above the dimension threshold, determining that pixels corresponding to linked cells of the group of chains correspond to a line of a stave if the adjacent cells corresponding to pixels being adjacent in a horizontal direction of the digital image or a stem of a note if the adjacent cells correspond to pixels being adjacent in a vertical direction of the digital image.

2. The method of claim 1, wherein the adjacent cells are directly adjacent cells corresponding to pixels being directly adjacent in one of the horizontal direction or the vertical direction.

3. The method of claim 1, wherein the adjacent chains of cells are directly adjacent chains of cells.

4. The method of claim 1, further comprising identifying contour cells of the group of chains, wherein the contour cells define a perimeter of pixels of the group of chains.

5. The method of claim 1, wherein determining a dimension of the group of chains comprises determining a dimension of a bounding box encompassing the group of chains.

6. A method of identifying at least a part of a musical character in a digital image of a musical score comprising:
converting the digital image into a matrix in which at least one cell of the matrix corresponds to a pixel of the digital image;
setting the at least one cell of the matrix to a first value if the corresponding pixel of the digital image has a pixel intensity above a threshold intensity;
identifying cells of the matrix corresponding to line pixels, the line pixels corresponding to a line of a stave and/or a stem of a note in the digital image;
identifying a split end of an object in the digital image, wherein the split end comprises cells having the first value and being directly adjacent to those identified as corresponding to line pixels;
adding at least one cell having the first value to the split end of the object to create a repaired object, the repaired object comprising the added at least one cell and the object, the at least one cell being directly adjacent to the split end of the object;
determining a matching value for the repaired object by comparing a characteristic of the repaired object with a characteristic of a representation of at least part of a musical character; and
determining that the repaired object corresponds to the at least part of a musical character if the matching value exceeds a matching threshold.

7. The method of claim 6, wherein the object comprises a group of pixels, the group of pixels all having the first value, wherein each pixel of the group of pixels is directly adjacent to at least one other pixel of the group of pixels.

8. The method of claim 6, wherein identifying the split end of the object further comprises:
determining a dimension of the object; and
comparing the dimension with an object threshold dimension;
wherein, if the dimension is above the object threshold dimension, adding the at least one cell having the first value to the split end of the object.

9. The method of claim 6, wherein the step of identifying cells of the matrix corresponding to line pixels comprises:
identifying adjacent cells having the first value as linked cells, the adjacent cells corresponding to pixels being adjacent in one of a horizontal direction or a vertical direction of the digital image;
identifying linked cells having a number of cells exceeding a threshold as a chain of cells;
grouping adjacent chains of cells into a group of chains;
determining a dimension of the group of chains; and
comparing the dimension with a dimension threshold;
wherein, if the dimension is above the dimension threshold, determining that pixels corresponding to linked cells of the group of chains correspond to a line of a stave if the adjacent cells corresponding to pixels being adjacent in a horizontal direction of the digital image or a stem of a note if the adjacent cells correspond to pixels being adjacent in a vertical direction of the digital image.

10. The method of claim 6, wherein the step of identifying cells of the matrix corresponding to line pixels comprises:
determining that cells with the first value in a row of the matrix correspond to a line of a stave if the total number of cells with the first value in the row is above a threshold value.

11. A method of re-engraving a digital image of a musical score comprising: identifying a line of a stave or a stem of a note via the method of claim 1; identifying cells of the matrix corresponding to line pixels, the line pixels corresponding to the line of the stave and/or the stem of the note in the digital image; identifying a split end of an object in the digital image, wherein the split end comprises cells having the first value and being directly adjacent to those identified as corresponding to line pixels; adding at least one cell having the first value to the split end of the object to create a repaired object, the repaired object comprising the added at least one cell and the object, the at least one cell being directly adjacent to the split end of the object; determining a matching value for the repaired object by comparing a characteristic of the repaired object with a characteristic of a representation of at least part of a musical character; and determining that the repaired object corresponds to the at least part of a musical character if the matching value exceeds a matching threshold; and creating a digital file comprising data corresponding to: the line of the stave or the stem of the note, and the musical character.

12. A method of re-engraving a digital image of a musical score comprising: identifying a line of a stave via the method of claim 1; identifying a musical character in the digital image of the musical score by a method comprising identifying cells of the matrix corresponding to line pixels, the line pixels corresponding to the line of the stave and/or the stem of the note in the digital image; identifying a split end of an object in the digital image, wherein the split end comprises cells having the first value and being directly adjacent to those identified as corresponding to line pixels; adding at least one cell having the first value to the split end of the object to create a repaired object, the repaired object comprising the added at least one cell and the object, the at least one cell being directly adjacent to the split end of the object; determining a matching value for the repaired object by comparing a characteristic of the repaired object with a characteristic of a representation of at least part of a musical character; and determining that the repaired object corresponds to the at least part of a musical character if the matching value exceeds a matching threshold; and creating a digital file comprising data corresponding to the line of the stave and the musical character.

13. The method of claim 1 further comprising:
identifying two diagonally connected cells having the first value;
identifying a weak-link cell, wherein the weak-link cell is a cell directly adjacent to both of the two diagonally connected cells; and
setting the weak-link cell to the first value.

* * * * *